United States Patent
Kearns et al.

(10) Patent No.: US 11,592,573 B2
(45) Date of Patent: Feb. 28, 2023

(54) PARTICLE FILTERS AND WIFI ROBOT LOCALIZATION AND MAPPING

(71) Applicant: iRobot Corporation, Bedford, MA (US)

(72) Inventors: Justin H. Kearns, Los Angeles, CA (US); Orjeta Taka, Los Angeles, CA (US)

(73) Assignee: iRobot Corporation, Bedford, MA (US)

(*) Notice: Subject to any disclaimer, the term of this patent is extended or adjusted under 35 U.S.C. 154(b) by 308 days.

(21) Appl. No.: 17/021,523

(22) Filed: Sep. 15, 2020

(65) Prior Publication Data
US 2022/0080600 A1 Mar. 17, 2022

(51) Int. Cl.
*G05D 1/02* (2020.01)
*G01S 17/93* (2020.01)
*A47L 11/40* (2006.01)

(52) U.S. Cl.
CPC .......... *G01S 17/93* (2013.01); *A47L 11/4011* (2013.01); *G05D 1/0214* (2013.01);
(Continued)

(58) Field of Classification Search
CPC .. G05D 1/0214; G05D 1/0227; G05D 1/0272; G05D 1/0274; G05D 2201/0203
See application file for complete search history.

(56) References Cited

U.S. PATENT DOCUMENTS 9,020,637 B2* 4/2015 Schnittman .......... G05D 1/0227
382/106
9,037,396 B2* 5/2015 Pack ...................... G01C 21/20
701/409
(Continued)

FOREIGN PATENT DOCUMENTS

WO WO-2014055278 A1 * 4/2014 ............ G01C 21/20
WO 2019126332 6/2019
WO WO-2022060531 A1 3/2022

OTHER PUBLICATIONS

D. Mukherjee, A. Saha, P. Mendapara, D. Wu and Q. M. J. Wu, "A cost effective probabilistic approach to localization and mapping," 2009 IEEE International Conference on Electro/Information Technology, 2009, pp. 359-366 (Year: 2009).*
(Continued)

*Primary Examiner* — Adam R Mott
*Assistant Examiner* — Sagar Kc
(74) *Attorney, Agent, or Firm* — Schwegman Lundberg & Woessner, P.A.

(57) ABSTRACT

Robot localization or mapping can be provided without requiring the expense or complexity of an "at-a-distance" sensor, such as a camera, a LIDAR sensor, or the like. Landmark features can be created or matched using motion sensor data, such as odometry or gyro data or the like, and adjacency sensor data. Despite the relative ambiguity of adjacency-sensor derived landmark features, a particle filter approach can be configured to use such information, instead of requiring "at-a-distance" information from a constant stream of visual images from a camera, such as for robot localization or mapping. Landmark sequence constraints or a Wi-Fi signal strength map can be used together with the particle filter approach.

30 Claims, 13 Drawing Sheets

(52) U.S. Cl.
CPC ......... *G05D 1/0227* (2013.01); *G05D 1/0272* (2013.01); *G05D 1/0274* (2013.01); *A47L 2201/04* (2013.01); *G05D 2201/0203* (2013.01)

(56) References Cited

U.S. PATENT DOCUMENTS

| | | | | |
|---|---|---|---|---|
| 9,226,111 | B2* | 12/2015 | Marti | H04W 4/021 |
| 9,630,319 | B2* | 4/2017 | Vicenti | G05D 1/0219 |
| 2014/0129027 | A1* | 5/2014 | Schnittman | G05D 1/0242 |
| | | | | 700/253 |
| 2014/0141803 | A1* | 5/2014 | Marti | G01C 21/383 |
| | | | | 455/456.2 |
| 2014/0350839 | A1* | 11/2014 | Pack | G05D 1/0251 |
| | | | | 901/1 |
| 2016/0144505 | A1* | 5/2016 | Fong | B25J 9/1697 |
| | | | | 700/250 |
| 2016/0271795 | A1* | 9/2016 | Vicenti | G05D 1/0274 |
| 2017/0276501 | A1* | 9/2017 | Wise | G05D 1/0274 |
| 2020/0225673 | A1* | 7/2020 | Ebrahimi Afrouzi | G05D 1/0016 |
| 2020/0409382 | A1* | 12/2020 | Herman | A47L 9/30 |

OTHER PUBLICATIONS

J. Biswas and M. Veloso, "WiFi localization and navigation for autonomous indoor mobile robots," 2010 IEEE International Conference on Robotics and Automation, 2010, pp. 4379-4384 (Year: 2010).*

"International Application Serial No. PCT US2021 046912, International Search Report dated Dec. 8, 2021", 5 pgs.

"International Application Serial No. PCT US2021 046912, Written Opinion dated Dec. 8, 2021", 6 pgs.

Mukherjee, Dibyendu, "A Cost Effective Probabilistic Approach to Localization and Mapping", Electro Information Technology, Eit 09. IEEE International Conference on, IEEE, Piscataway, NJ, USA, (Jun. 7, 2009), 359-366.

* cited by examiner

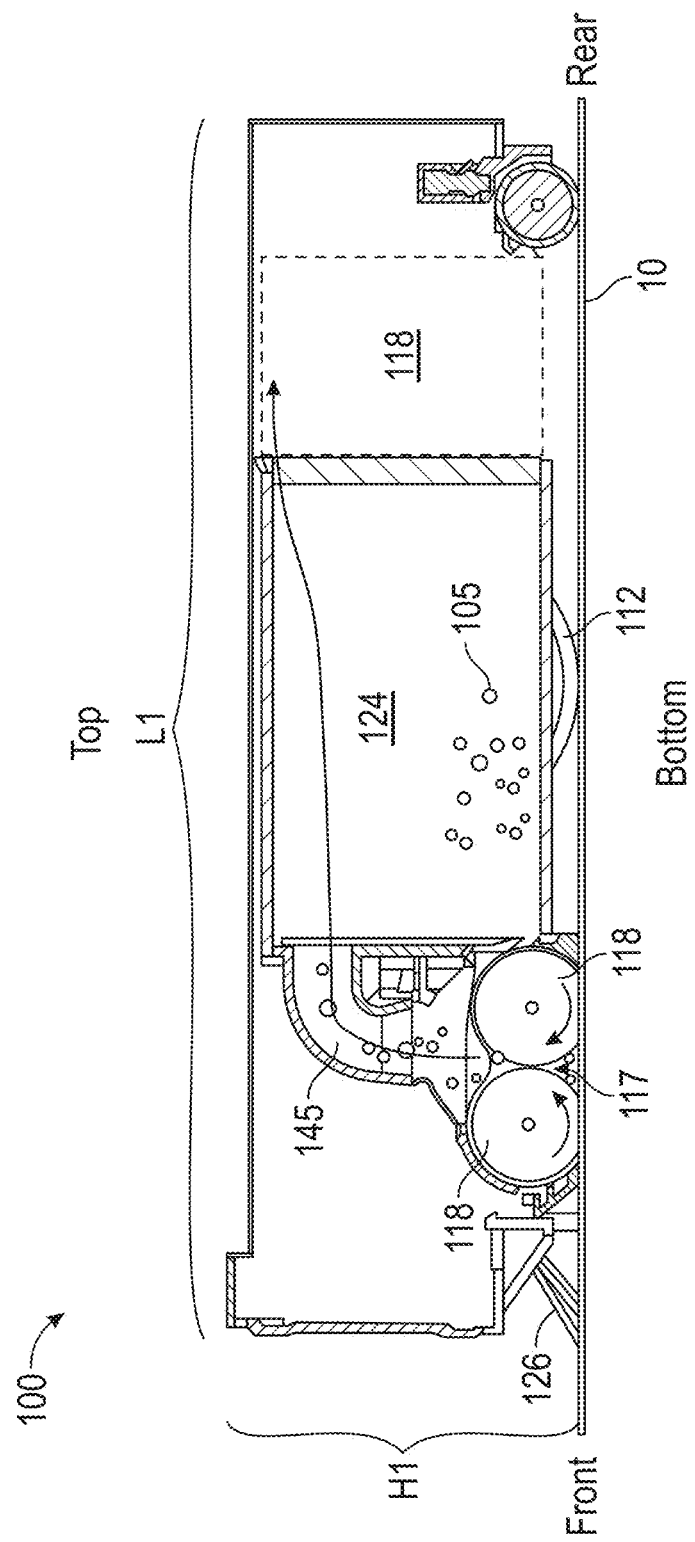

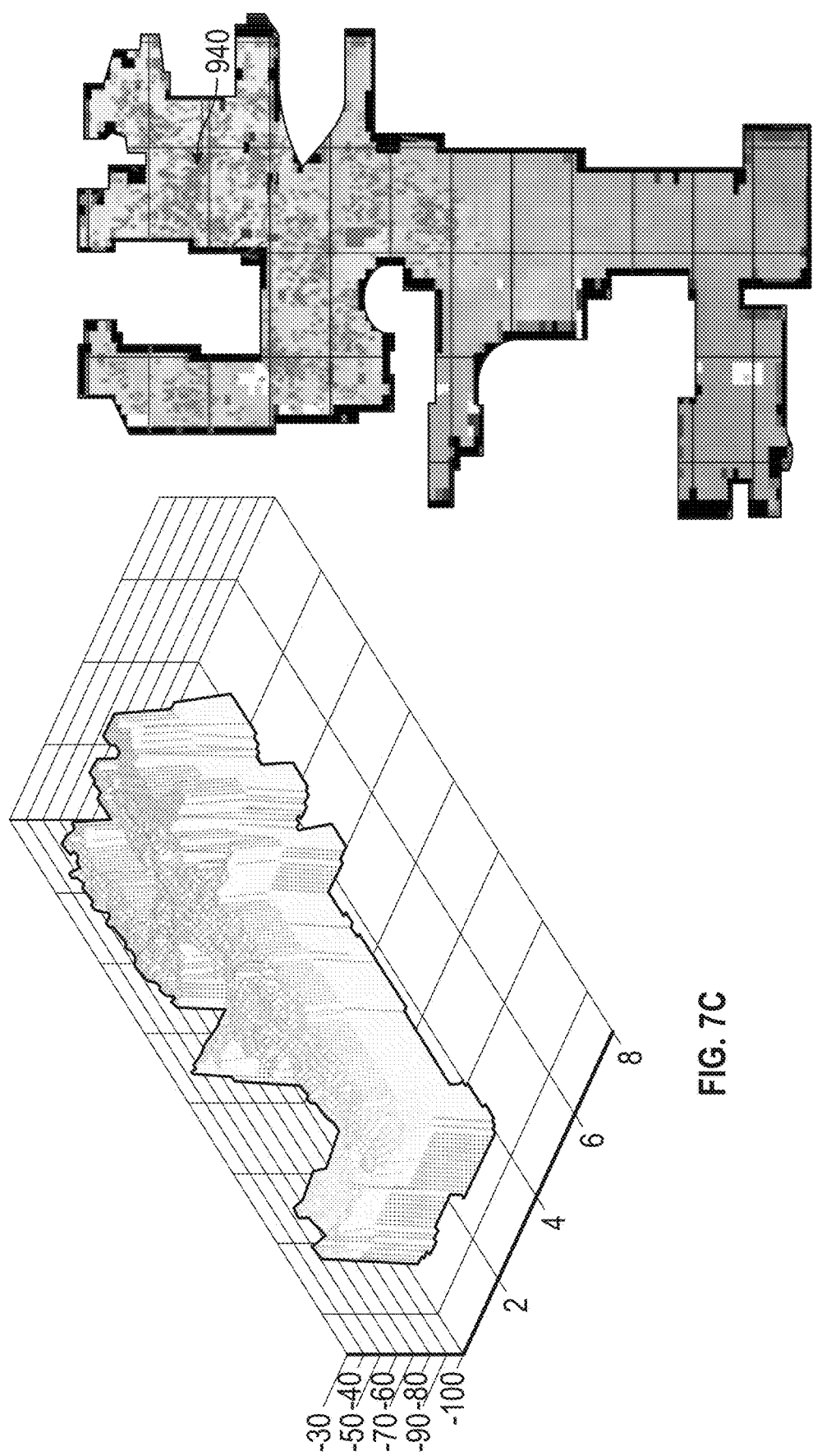

PARTICLE FILTERS AND WIFI ROBOT LOCALIZATION AND MAPPING

TECHNICAL FIELD

This document relates generally to mobile robots and, more particularly, to systems, devices, and methods for robot localization and mapping.

BACKGROUND

Autonomous mobile robots can move about an environment. The robot can perform several functions and operations in a variety of categories. Such functions can include, for example, security operations, infrastructure or maintenance operations, navigation or mapping operations, inventory management operations, and robot/human interaction operations. Mobile cleaning robots can autonomously perform cleaning tasks, such as within a home or other environment. Such cleaning robots can be autonomous to some degree and in different ways. For example, a cleaning robot can conduct cleaning missions, during which the robot traverses and concurrently ingests (e.g., vacuums) debris from the floor surface of the environment.

Some mobile robots are capable of storing a map of the robot environment. The map can be useful to determine robot localization information, such as can include one or more aspects of the robot's "pose", such as its location, its orientation, or both, within the mapped environment. The mobile robot can use the map, the localization information, or both, such as to help fulfill one or more of its goals, such as can include path planning or navigating the mobile robot about the environment such as to perform a cleaning or other mission.

Some mobile robots include an onboard camera, such as to collect a steady stream of monocular or binocular visual images of the surrounding environment from which a mobile robot's location or pose can be determined. Such visual images can include visual landmarks that can be recognized by image-processing circuitry onboard the mobile robot such as for use in such a determination. Such image processing and image recognition of such "at-a-distance" visual landmarks can be computationally expensive. Similarly, some mobile robots can use light detection and ranging (LIDAR) or other "at-a-distance" sensing for recognizing non-visual "at-a-distance" landmarks. Computationally expensive LIDAR signal processing can be needed for processing and recognition of such "at-a-distance" LIDAR landmarks. The cost of adding a camera or LIDAR or other "at-a-distance" sensors can increase the cost of the mobile robot.

SUMMARY/OVERVIEW

The present inventors have recognized, among other things, an unmet need to provide robot localization or mapping without requiring the expense and complexity of an "at-a-distance" sensor, such as a camera, a LIDAR sensor, or the like.

This can involve using an "adjacency sensor" instead of requiring an "at-a-distance" sensor. An illustrative example of such an adjacency sensor can include a bump force sensor indicating when a mobile cleaning robot bumps against and thereby contacts an object or obstacle in the environment. Another illustrative example of such an adjacency sensor can include a "wall-following" sensor such as can include a short-range infra-red (IR) or other optical sensor. Such a short-range adjacency sensor can be configured to indicate that the mobile cleaning robot is about to bump up against an adjacent object or obstacle, for example, when the adjacent object or obstacle becomes close enough to the mobile cleaning robot—without requiring that the mobile cleaning robot actually bump up against and contact the adjacent object or obstacle in the environment. Such an adjacency sensor can also include a cliff sensor, such as can indicate that the mobile cleaning robot is about to drive over a floor surface variation, such as a cliff. Such adjacency sensors can be less expensive and can involve less complex signal processing by the mobile cleaning robot—and may already be needed by the mobile robot for other purposes.

The adjacency sensor approach can be used with a particle filter technique for robot localization—without requiring a camera or other "at a distance" sensor. The particle filter technique can, in turn, be used with a map of Wi-Fi signal strength, such as to help reduce ambiguity between adjacency-derived landmark features, to help select more useful adjacency-derived landmark features for mapping, or to otherwise speed or help localization convergence of the particle filter localization of the robot.

This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIGS. 1, 2A, and 2B are side cross-sectional, bottom, and top perspective views of a mobile robot.

FIGS. 7A, 7B, and 7C show examples of maps associated an example that can additionally use Wi-Fi signal-strength.

FIGS. 8A, 8B, and 8C show a corresponding temporal sequence of a localization mode in which the particle filter can also use Wi-Fi signal strength, such as for selecting identified landmark features or generating or weighting particles.

DETAILED DESCRIPTION

This document describes techniques for robot localization and mapping of environment that need not rely on an "at-a-distance" sensor. The present techniques can involve using an "adjacency sensor" instead of requiring an "at-a-distance" sensor. While this can be a cheaper and efficient approach, it presents a technical challenge of how to perform such localization and mapping without requiring the use of range or distance information that an "at-a-distance" sensor can provide. This document describes ways to use adjacency sensor and robot motion information to perform robot localization and mapping. In particular, this document also describes a particle filter approach to robot localization without requiring the use of range or distance information that an "at-a-distance" sensor can provide. Further, this document describes how to use WiFi signal-strength map information together with the particle filter approach, such as to improve the ability of the particle filter approach to converge upon a localization solution using adjacency-derived landmark features, instead of requiring a steady-stream of visual images from a camera or other "at a distance" sensor.

In the following, mobile robot and its working environment are briefly discussed with reference to FIGS. 1-4. An illustrative example of using creating and using adjacency-derived landmark features is discussed with reference to FIGS. 5-8. An example of using a particle filter approach to robot localization using adjacency sensor data instead of a camera or other "at-a-distance" sensor is discussed with reference to FIGS. 5-8, including techniques for using a WiFi signal strength map to help improve performance of the particle filter approach in the absence of a camera or other "at-a-distance" sensor being required onboard the mobile robot.

Autonomous Mobile Cleaning Robot Platform Examples

Figure 2A:
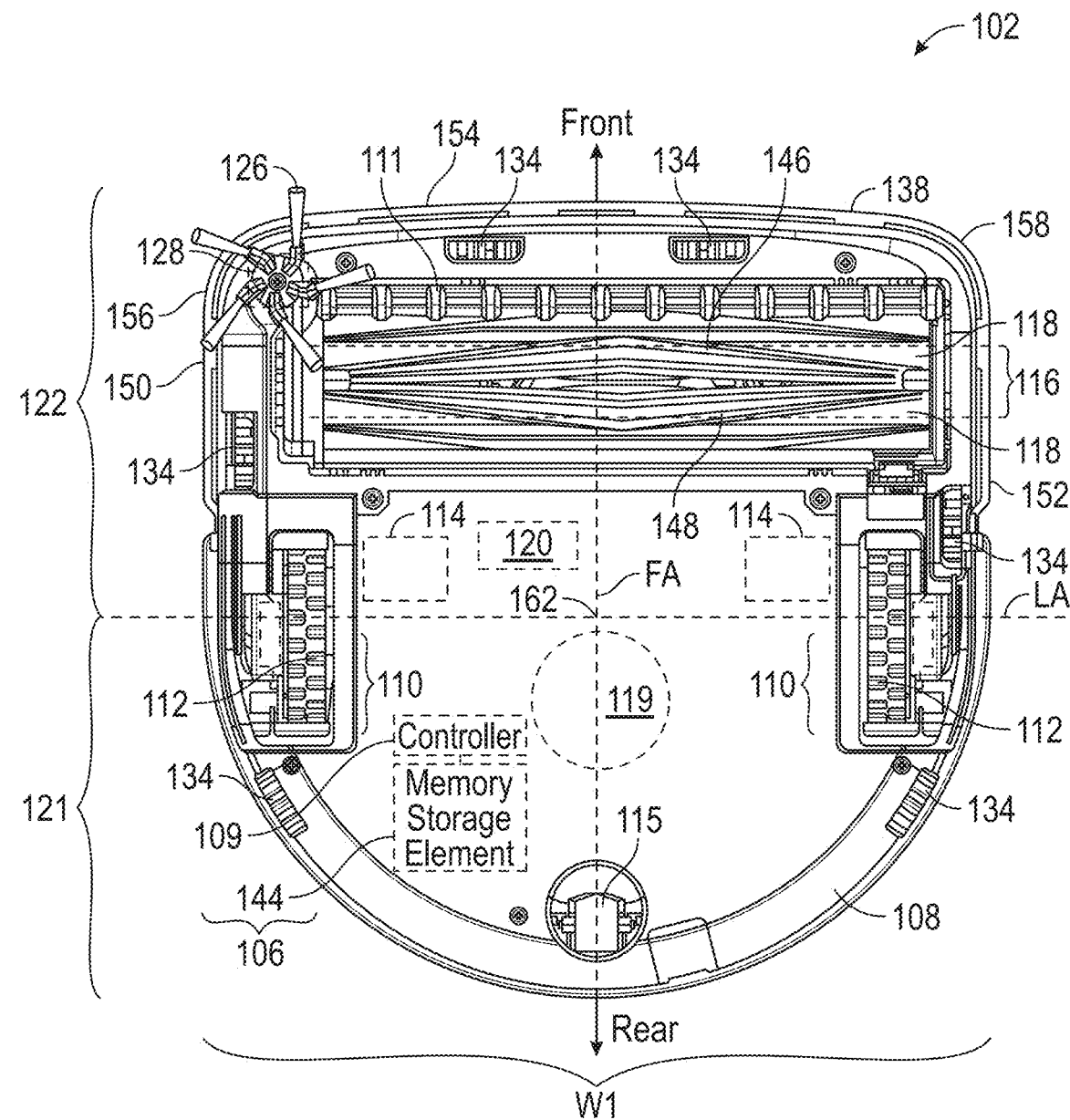
Figure 2B:
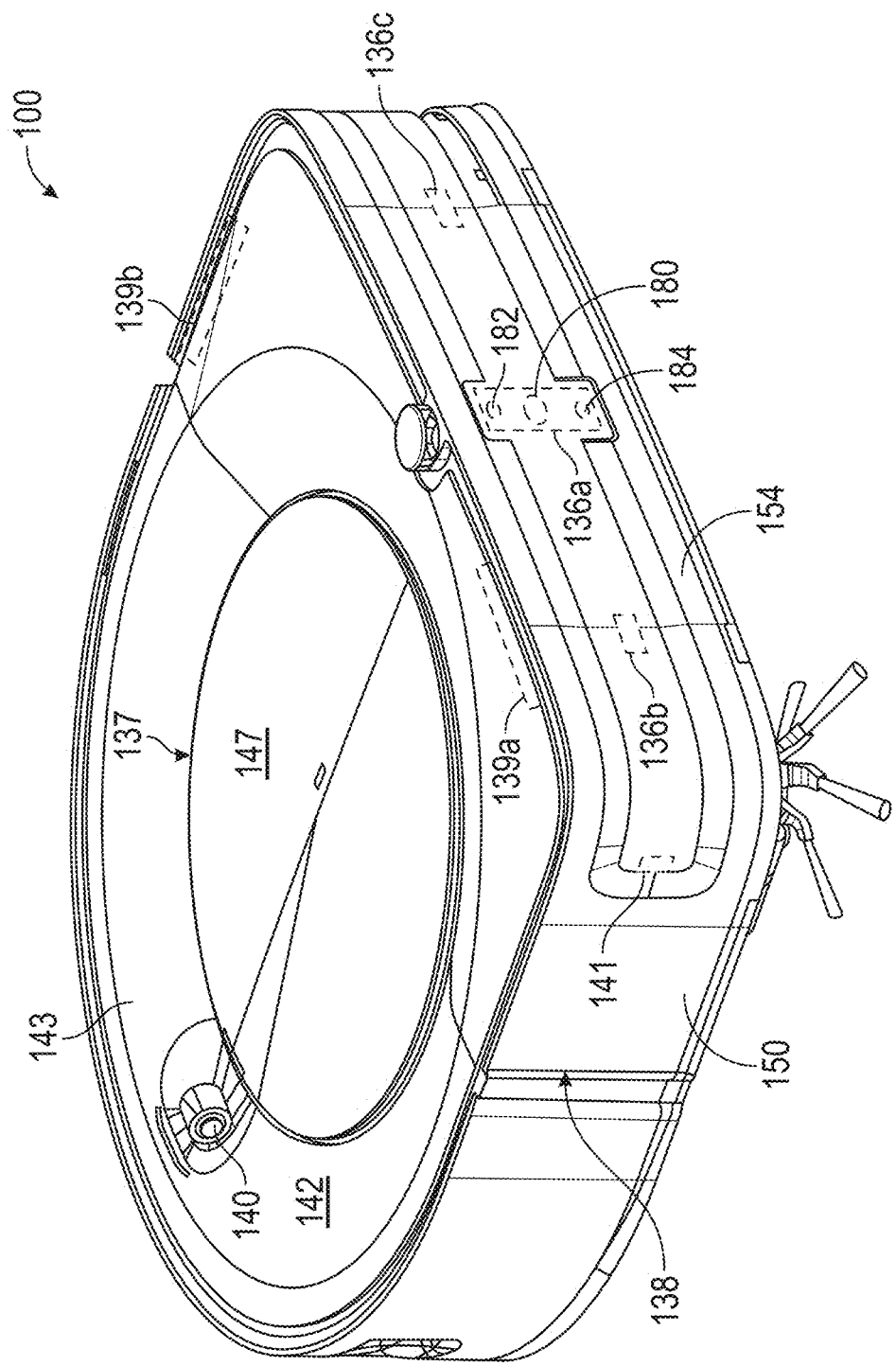

FIGS. 1 and 2A-2B depict different views of an example of a mobile robot, such as mobile cleaning robot 100. As shown in FIG. 1, the mobile cleaning robot 100 can collect debris 105 from the floor surface 10 as the mobile cleaning robot 100 traverses the floor surface 10. FIG. 2A shows an example of the mobile cleaning robot 100, such as can include a robot housing infrastructure 108. The housing infrastructure 108 can define a structural periphery of the mobile cleaning robot 100. The housing infrastructure 108 can include a chassis, cover, bottom plate, and bumper assembly. The mobile cleaning robot 100 can be a household robot that can have a small profile, such as to help permit the mobile cleaning robot 100 to fit under furniture within a home. In the example of FIG. 1, a height H1 of the mobile cleaning robot 100 relative to the floor surface is, for example, no more than 13 centimeters. The mobile cleaning robot 100 is also compact. An overall length L1 (shown in FIG. 1) of the mobile cleaning robot 100 and an overall width W1 (shown in FIG. 2A) are each between 30 and 60 centimeters, e.g., between 30 and 40 centimeters, between 40 and 50 centimeters, or between 50 and 60 centimeters. The overall width W1 can correspond to a width of the housing infrastructure 108 of the mobile cleaning robot 100.

The mobile cleaning robot 100 can include a drive system 110, such as can include one or more drive wheels. The drive system 110 can further include one or more electric motors, such as can include electrically driven portions, forming part of the electrical circuitry 106. The housing infrastructure 108 can support the electrical circuitry 106, which can include a controller circuit 109, within the mobile cleaning robot 100.

The drive system 110 can be configured to be operable to propel the mobile cleaning robot 100 across the floor surface 10. The mobile cleaning robot 100 can be propelled in a forward drive direction F or a rearward drive direction R. The mobile cleaning robot 100 can also be propelled such that the mobile cleaning robot 100 can turn, such as to turn in place, or to turn while moving in the forward drive direction F or the rearward drive direction R. In FIG. 2A, the mobile cleaning robot 100 can include drive wheels 112, such as extending through a bottom portion of the housing infrastructure 108. The drive wheels 112 can be rotated by respective motors 114, such as to cause movement of the mobile cleaning robot 100 along the floor surface 10. The mobile cleaning robot 100 can further include a passive wheel, such as a passive caster wheel 115, such as extending through the bottom portion 113 of the housing infrastructure 108. The caster wheel 115 need not be powered. Together, the drive wheels 112 and the caster wheel 115 can cooperate to support the housing infrastructure 108 above the floor surface 10. For example, the caster wheel 115 can be disposed along a rearward portion 121 of the housing infrastructure 108, and the drive wheels 112 can be disposed forward of the caster wheel 115.

In FIG. 2B, the mobile cleaning robot 100 can include a forward portion 122 that can be substantially rectangular and a rearward portion 121 that can be curved, e.g., such as substantially semicircular. The forward portion 122 can include side surfaces 150, 152, a forward surface 154, and corner surfaces 156, 158. The corner surfaces 156, 158 of the forward portions 122 can connect the side surface 150, 152 to the forward surface 154.

In FIGS. 1 and 2A-2B, the mobile cleaning robot 100 can include a cleaning head assembly 116 (such as shown in FIG. 2A) such as can be configured to be operable to clean the floor surface 10. For example, the mobile cleaning robot 100 can be a vacuum cleaning robot in which the cleaning head assembly 116 can be configured to be operable to clean the floor surface 10 by ingesting debris 105 (such as shown in FIG. 1) from the floor surface 10. The cleaning head assembly 116 can include a cleaning inlet 117 through which debris can be collected by the mobile cleaning robot 100. The cleaning inlet 117 can be located forward of a center of the mobile cleaning robot 100, e.g., forward of a center 162, and along the forward portion 122 of the mobile cleaning robot 100 between the side surfaces 150, 152 of the forward portion 122.

The cleaning head assembly 116 can include one or more rotatable members 118, such as can be driven by a roller motor 120. The rotatable members 118 can extend horizontally across the forward portion 122 of the mobile cleaning robot 100. The rotatable members 118 can be located along a forward portion 122 of the housing infrastructure 108. The rotatable member 118 can extend along 75% to 95% of a width of the forward portion 122 of the housing infrastructure 108, e.g., corresponding to an overall width W1 of the mobile cleaning robot 100. In FIG. 1, the cleaning inlet 117 can be located between the rotatable members 118.

In FIG. 1, the rotatable members 118 can include rollers that counter rotate relative to one another. For example, the rotatable members 118 can include a front roller and a rear roller mounted parallel to the floor surface and spaced apart from one another by a small elongated gap. The rotatable members 118 can be rotatable about parallel horizontal axes 146, 148 (shown in FIG. 2A) such as to agitate debris 105 on the floor surface 10 and direct the debris 105 toward the cleaning inlet 117, into the cleaning inlet 117, and into a suction pathway 145 (shown in FIG. 1) in the mobile cleaning robot 100. In FIG. 2A, the rotatable members 118 can be positioned entirely within the forward portion 122 of the mobile cleaning robot 100. The rotatable members 118 can include elastomeric shells that can contact debris 105 on the floor surface 10 to direct debris 105 through the cleaning inlet 117 between the rotatable members 118 and into an interior of the mobile cleaning robot 100, e.g., into a debris bin 124 (shown in FIG. 1), as the rotatable members 118 rotate relative to the housing infrastructure 108. The rotatable members 118 can further contact the floor surface 10 to agitate debris 105 on the floor surface 10. In FIG. 2A, the rotatable members 118, such as front and rear rollers, can each feature a pattern of chevron-shaped vanes distributed along its cylindrical exterior, and the vanes of at least one roller can make contact with the floor surface along the length of the roller and experience a consistently applied friction force during rotation that is not present with brushes having pliable bristles.

The rotatable members 118 may take other suitable configurations. For example, at least one of the front and rear rollers may include bristles and/or elongated pliable flaps for agitating the floor surface. In an example, a flapper brush, rotatably coupled to the cleaning head assembly housing, can include a compliant flap extending radially outward from the core such as to sweep a floor surface as the roller is driven to rotate. The flap can be configured to inhibit or prevent errant filaments from spooling tightly about the core, such as to help aid subsequent removal of the filaments. The flapper brush can include axial end guards mounted on the core adjacent the ends of the outer core surface and configured to inhibit or prevent spooled filaments from traversing axially from the outer core surface onto the mounting features. The flapper brush can include multiple floor cleaning bristles extending radially outward from the core.

The mobile cleaning robot 100 can further include a vacuum system 119 that can be configured to be operable to generate an airflow through the cleaning inlet 117 between the rotatable members 118 and into the debris bin 124. The vacuum system 119 can include an impeller and a motor to rotate the impeller to generate the airflow. The vacuum system 119 can be configured to cooperate with the cleaning head assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The mobile cleaning robot 100 can further include a brush 126 (also referred to as a side brush) such as can rotate about a non-horizontal axis, e.g., an axis forming an angle between 75 degrees and 90 degrees with the floor surface 10. The non-horizontal axis, for example, can form an angle between 75 degrees and 90 degrees with the longitudinal axes of the rotatable members 118. The mobile cleaning robot 100 can include a brush motor 128 operably connected to the side brush 126 to rotate the side brush 126.

The brush 126 is a side brush laterally offset from a fore-aft axis FA of the mobile cleaning robot 100 such as to permit the brush 126 to extend beyond an outer perimeter of the housing infrastructure 108 of the mobile cleaning robot 100. For example, the brush 126 can extend beyond one of the side surfaces 150, 152 of the mobile cleaning robot 100 and can thereby be capable of engaging debris on portions of the floor surface 10 that the rotatable members 118 typically cannot reach, e.g., portions of the floor surface 10 outside of a portion of the floor surface 10 directly underneath the mobile cleaning robot 100. The brush 126 can also be forwardly offset from a lateral axis LA of the mobile cleaning robot 100 such that the brush 126 also extends beyond the forward surface 154 of the housing infrastructure 108. In FIG. 2A, the brush 126 can extend beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 can be positioned to contact the floor surface 10 during its rotation so that the brush 126 can easily engage the debris 105 on the floor surface 10.

The brush 126 can be rotatable about the non-horizontal axis in a manner that brushes debris on the floor surface 10 into a cleaning path of the cleaning head assembly 116 as the mobile cleaning robot 100 moves. For example, when the mobile cleaning robot 100 is moving in the forward drive direction F, the brush 126 can be rotatable in a clockwise direction (when viewed from a perspective above the mobile cleaning robot 100) such that debris that the brush 126 contacts moves toward the cleaning head assembly and toward a portion of the floor surface 10 in front of the cleaning head assembly 116 in the forward drive direction F. As a result, as the mobile cleaning robot 100 moves in the forward drive direction F, the cleaning inlet 117 of the mobile cleaning robot 100 can collect the debris swept by the brush 126. When the mobile cleaning robot 100 is moving in the rearward drive direction R, the brush 126 can be rotatable in a counterclockwise direction (when viewed from a perspective above the mobile cleaning robot 100) such that debris that the brush 126 contacts moves toward a portion of the floor surface 10 behind the cleaning head assembly 116 in the rearward drive direction R. As a result, as the mobile cleaning robot 100 moves in the rearward drive direction R, the cleaning inlet 117 of the mobile cleaning robot 100 can collect the debris swept by the brush 126.

The electrical circuitry 106 can include, in addition to the controller circuit 109, a memory storage element 144 and a sensor system with one or more electrical sensors, for example. The sensor system can generate a signal indicative of a current location of the mobile cleaning robot 100. The sensor system can generate signals indicative of locations of or movement of the mobile cleaning robot 100 as the mobile cleaning robot 100 travels along the floor surface 10. The controller circuit 109 can be configured to execute instructions to perform one or more operations as described herein. The memory storage element 144 can be accessible by the controller circuit 109 and can be disposed within the housing infrastructure 108. The one or more electrical sensors can be configured to detect one or more features in an environment of the mobile cleaning robot 100. In FIG. 2A, the sensor system can include one or more cliff sensors 134 such as can be disposed along the bottom portion 113 of the housing infrastructure 108. Each of the cliff sensors 134 can include an optical sensor that can detect the presence or the absence of an object below the optical sensor, such as the presence or absence of the floor surface 10. The cliff sensors 134 can thus be regarded as an adjacency sensor that can detect adjacent obstacles such as drop-offs and cliffs below portions of the mobile cleaning robot 100 where the cliff sensors 134 are disposed and can provide information to the controller circuit 109 to redirect the robot accordingly. More details of the sensor system and the controller circuit 109 are described below, such as with reference to FIG. 3.

In FIG. 2B, the sensor system can include one or more proximity sensors that can detect objects along the floor surface 10 that are near the mobile cleaning robot 100. For example, the sensor system can include proximity sensors 136a, 136b, 136c such as can be disposed proximate the forward surface 154 of the housing infrastructure 108. Each of the proximity sensors 136a, 136b, 136c can include an optical sensor facing outward from the forward surface 154 of the housing infrastructure 108 and that can detect the presence or the absence of an object in front of the optical sensor, such as can provide an adjacency sensor to generate adjacency sensor data. For example, the detectable objects can include one or more obstacles such as furniture, walls, persons, and other objects in the environment of the mobile cleaning robot 100. When configured as an adjacency sensor, such sensors can indicate whether an object is adjacent to or in contact with the mobile cleaning robot 100.

The sensor system can include a bumper system, such as can include the bumper 138 and one or more bump sensors such as can be configured to detect contact between the bumper 138 and one or more obstacles in the environment. The bumper 138 can form part of the housing infrastructure 108. For example, the bumper 138 can form the side surfaces 150, 152 as well as the forward surface 154. The sensor system, for example, can include the bump sensors 139a, 139b. The bump sensors 139a, 139b can include one or more of a break beam sensor, a capacitive sensor, or one or more other sensors such as can detect contact between the mobile cleaning robot 100, e.g., the bumper 138, and one or more objects in the environment. For example, the bump sensor 139a can be used to detect movement of the bumper 138 along the fore-aft axis FA (shown in FIG. 2A) of the mobile cleaning robot 100, and the bump sensor 139b can be used to detect movement of the bumper 138 along the lateral axis LA (shown in FIG. 2A) of the mobile cleaning robot 100. The proximity sensors 136a, 136b, 136c can detect adjacent objects before the mobile cleaning robot 100 contacts the objects, and the bump sensors 139a, 139b can detect objects that contact the bumper 138, e.g., in response to the mobile cleaning robot 100 bumping into or similarly contacting the objects.

The sensor system can include one or more obstacle following sensors. For example, the mobile cleaning robot 100 can include an obstacle following sensor 141 along the side surface 150. The obstacle following sensor 141 can include an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the mobile cleaning robot 100 and perpendicular to the side surface 150 of the mobile cleaning robot 100. For example, the detectable objects can include adjacent obstacles such as furniture, walls, persons, and other objects in the environment of the mobile cleaning robot 100. The sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In an example, the left obstacle following can be used to determine a distance between an object, e.g., an obstacle surface, to the left of the mobile cleaning robot 100 and the mobile cleaning robot 100, and the right obstacle following sensor can be used to determine a distance between an object, e.g., an obstacle surface, to the right of the mobile cleaning robot 100 and the mobile cleaning robot 100.

In some implementations, at least some of the proximity sensors 136a, 136b, 136c, and the obstacle following sensor 141 can include an optical emitter and an optical detector. The optical emitter can emit an optical beam outward from the mobile cleaning robot 100, e.g., outward in a horizontal direction, and the optical detector can detect a reflection of the optical beam that reflects off an object near the mobile cleaning robot 100. The mobile cleaning robot 100, e.g., using the controller circuit 109, can determine a time-of-flight (ToF) of the optical beam and can thereby determine a distance between the optical detector and the object, and hence a distance between the mobile cleaning robot 100 and the object.

The proximity sensor 136a can include an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the emitted optical beams. In some implementations, the optical detector 180 can include an imaging sensor, a camera, or some other type of detection device for sensing optical signals. In some implementations, the optical beams can illuminate horizontal lines along a planar vertical surface forward of the mobile cleaning robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacle surfaces adjacent to one another. The optical detector 180 can capture an image representative of the grid of dots formed by the optical emitter 182 and the grid of dots formed by the optical emitter 184. Based on a size of a dot in the image, the mobile cleaning robot 100 can determine a distance of an object on which the dot appears relative to the optical detector 180, e.g., relative to the mobile cleaning robot 100. The mobile cleaning robot 100 can make this determination for each of the dots, thus allowing the mobile cleaning robot 100 to determine a shape of an object on which the dots appear. In addition, if multiple objects are ahead of the mobile cleaning robot 100, the mobile cleaning robot 100 can determine a shape of each of the objects. In some implementations, the objects can include one or more objects that are laterally offset from a portion of the floor surface 10 directly in front of the mobile cleaning robot 100.

The sensor system can further include an optional image capture device 140, e.g., a camera, directed toward a top portion 142 of the housing infrastructure 108. The image capture device 140 can generate digital imagery of the environment of the mobile cleaning robot 100 such as while the mobile cleaning robot 100 moves about the floor surface 10. The image capture device 140 can be angled in an upward direction, e.g., angled between 30 degrees and 80 degrees from the floor surface 10 about which the mobile cleaning robot 100 navigates. The camera, when angled upward, can be configured to capture visual images of wall surfaces of the environment so that visual features corresponding to objects on the wall surfaces can be used as landmarks for localization.

When the controller circuit 109 causes the mobile cleaning robot 100 to initiate or perform the mission, the controller circuit 109 operates the motors 114 to drive the drive wheels 112 and propel the mobile cleaning robot 100 along the floor surface 10. In addition, the controller circuit 109 operates the roller motor 120 to cause the rotatable members 118 to rotate, operates the brush motor 128 to cause the side brush 126 to rotate, and operates the motor of the vacuum system 119 to generate the airflow. To cause the mobile cleaning robot 100 to perform various navigational and cleaning behaviors, the controller circuit 109 can executes instructions that can be stored on the memory storage element 144 such as to cause the mobile cleaning robot 100 to perform by operating one or more motors of the mobile cleaning robot 100. The controller circuit 109 can operate the various motors of the mobile cleaning robot 100 to cause the mobile cleaning robot 100 to perform the behaviors.

The sensor system can further include one or more odometry sensors such as for tracking a distance travelled by the mobile cleaning robot 100. For example, the sensor system can include one or more encoders respectively associated with the motors 114 for the drive wheels 112. These encoders can track a distance that the mobile cleaning robot 100 has travelled. The sensor system can include an optical sensor such as facing downward toward a floor surface. The optical sensor can be an optical mouse sensor. For example, the optical sensor can be positioned to direct light through a bottom surface of the mobile cleaning robot 100 toward the floor surface 10. The optical sensor can detect reflections of the light and can detect a distance travelled by the mobile cleaning robot 100, such as based on one or more changes in floor features as the mobile cleaning robot 100 travels along the floor surface 10.

The controller circuit 109 can use data collected by one or more of the sensors of the sensor system such as to control navigational behaviors of the mobile cleaning robot 100 during the mission. For example, the controller circuit 109 can use the sensor data collected by obstacle detection sensors of the mobile cleaning robot 100, e.g., the cliff sensors 134, the proximity sensors 136a, 136b, 136c, and the bump sensors 139a, 139b, to enable the mobile cleaning robot 100 to avoid obstacles or to prevent the mobile cleaning robot 100 from falling down stairs within the environment of the mobile cleaning robot 100 during the mission. The controller circuit 109 can control the navigational behavior of the mobile cleaning robot 100 using information about the environment, such as a map of the environment. With proper navigation, the mobile cleaning robot 100 can be able to reach a goal position or to complete a coverage mission as efficiently and as reliably as possible.

The sensor data can be used by the controller circuit 109 for simultaneous localization and mapping (SLAM) techniques, such as in which the controller circuit 109 extracts one or more features of the environment represented by the sensor data and constructs a map of the floor surface 10 of the environment. The sensor data collected by the image capture device 140 can be used for techniques such as vision-based SLAM (VSLAM) in which the controller circuit 109 extracts visual features corresponding to objects in the environment and constructs the map using these visual features as visual landmarks. As the controller circuit 109 directs the mobile cleaning robot 100 about the floor surface 10 during the mission, the controller circuit 109 can use SLAM techniques to determine a location of the mobile cleaning robot 100 within the map by detecting visual features represented in collected sensor data and comparing the visual features to previously stored visual features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory storage element 144. In addition, other data generated for the SLAM techniques, including mapping data forming the map, can be stored in the memory storage element 144. These data produced during or ancillary to the mission can include persistent data that are produced during the mission and that are usable during a further mission. For example, the mission can be a first mission, and the further mission can be a second mission occurring after the first mission. In addition to storing the software for causing the mobile cleaning robot 100 to perform its behaviors, the memory storage element 144 can store sensor data or data resulting from processing of the sensor data for access by the controller circuit 109 from one mission to another mission. For example, the map can be a persistent map that is usable and updateable by the controller circuit 109 of the mobile cleaning robot 100 from one mission to another mission to help navigate the mobile cleaning robot 100 about the floor surface 10. The persistent map can be updated in response to instruction commands received from a user. The controller circuit 109 can modify subsequent or future navigational behaviors of the mobile cleaning robot 100 such as according to the updated persistent map, such as by modifying the planned path or updating obstacle avoidance strategy.

The persistent data, including the persistent map, can be used to help enable the mobile cleaning robot 100 to efficiently clean the floor surface 10. For example, the persistent map can enable the controller circuit 109 to direct the mobile cleaning robot 100 toward open floor space and to avoid non-traversable space. Also, for subsequent missions, the controller circuit 109 can plan navigation of the mobile cleaning robot 100 through the environment using the persistent map to control, improve, or optimize paths taken during the missions.

The mobile cleaning robot 100 can include a light indicator system 137 such as can be located on the top portion 142 of the mobile cleaning robot 100. The light indicator system 137 can include one or more light sources positioned within a lid 147 covering the debris bin 124 (shown in FIG. 2A). The light sources can be positioned to direct light to a periphery of the lid 147. The light sources can be positioned such that any portion of a continuous loop 143 on the top portion 142 of the mobile cleaning robot 100 can be illuminated. The continuous loop 143 can be located on a recessed portion of the top portion 142 of the mobile cleaning robot 100 such that the light sources can illuminate a surface of the mobile cleaning robot 100 as the light sources are activated.

Figure 3:
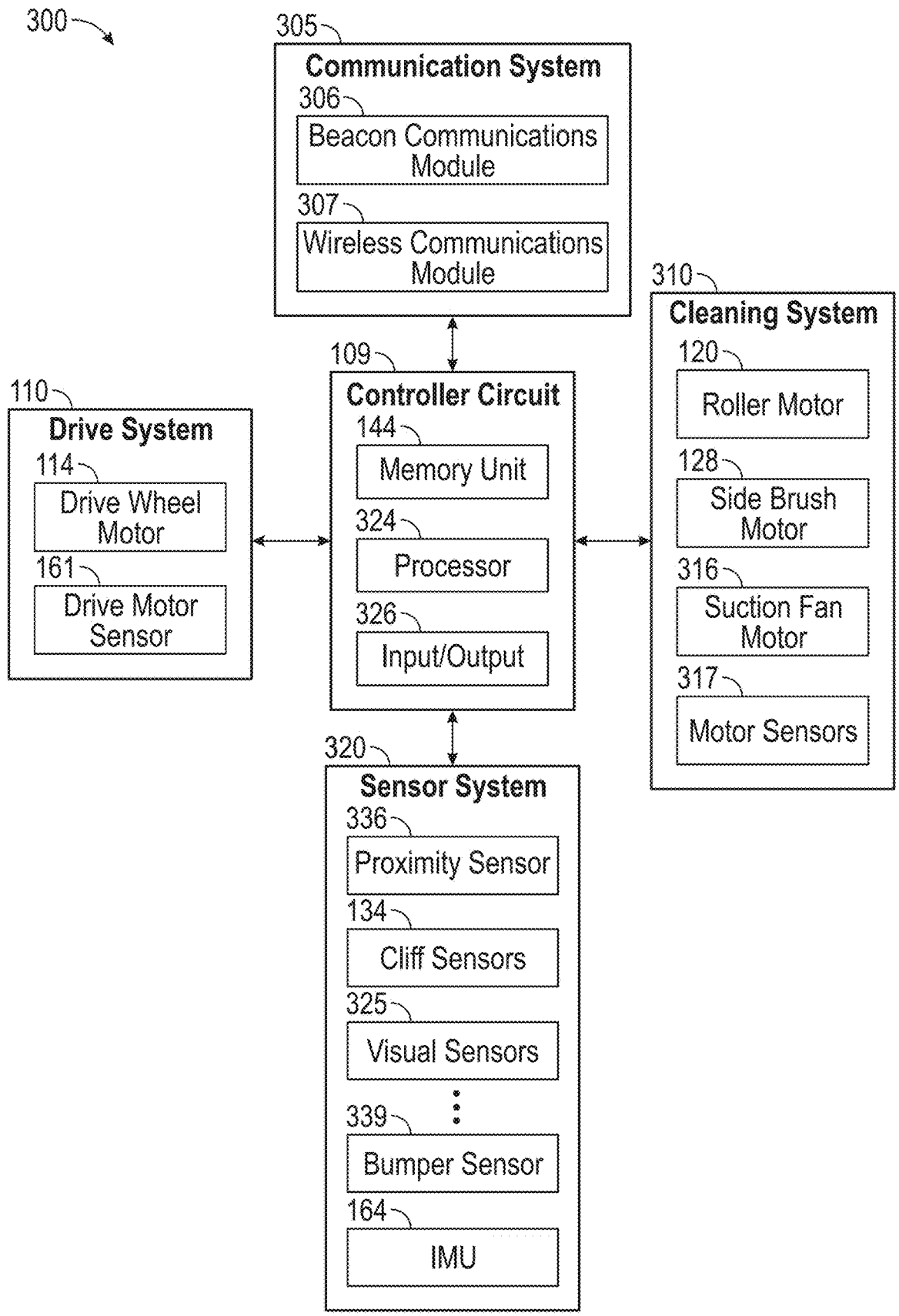
FIG. 3 is a diagram illustrating an example of a control architecture for operating a mobile cleaning robot.

FIG. 3 is a diagram illustrating an example of a control architecture 300 for operating a mobile cleaning robot such as the mobile cleaning robot 100. The controller circuit 109 can be communicatively coupled to various subsystems of the mobile cleaning robot 100, including a communications system 305, a cleaning system 310, a drive system 110, and a sensor system 320. The controller circuit 109 can include or be coupled to a memory storage element 144 that can hold data and instructions for processing by a processor 324. The processor 324 can receive program instructions and sensor feedback or other operational data from the memory storage element 144, can executes logical or other operations called for by the program instructions, and can generate command signals for operating the respective subsystem components of the mobile cleaning robot 100. An input/output unit 326 can transmit the command signals and can receive feedback from the various illustrated components.

The communications system 305 can include a beacon communications module 306 and a wireless communications module 307. The beacon communications module 306 may be communicatively coupled to the controller circuit 109. The beacon communications module 306 can be configured to be operable to send and receive signals to and from a remote device. For example, the beacon communications module 306 may detect a navigation signal projected from an emitter of a navigation or virtual wall beacon or a homing signal projected from the emitter of a docking station. Illustrative examples of docking, confinement, home base, and homing technologies are described in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 can facilitate the communication of information describing a status of the mobile cleaning robot 100 over a suitable wireless network (e.g., a wireless local area network) with one or more mobile devices (e.g., mobile device 404 shown in FIG. 4A). More details of the communications system 305 are described below, such as with reference to FIG. 4A.

The cleaning system 310 can include the roller motor 120, a brush motor 128 driving the side brush 126, and a suction fan motor 316 powering the vacuum system 119. The cleaning system 310 can further include multiple motor sensors 317 such as can monitor operation of the roller motor 120, the brush motor 128, and the suction fan motor 316, such as to facilitate closed-loop control of the motors by the controller circuit 109. The roller motor 120 can be operated by the controller circuit 109 (or a suitable microcontroller) to drive the rollers (e.g., rotatable members 118) according to a particular speed setting such as via a closed-loop pulse-width modulation (PWM) technique, in which a feedback signal can be received from a motor sensor 317 monitoring a signal indicative of the rotational speed of the roller motor 120. For example, such a motor sensor 317 may be provided in the form of a motor current sensor (e.g., a shunt resistor, a current-sensing transformer, and/or a Hall Effect current sensor).

The drive system 110 can include a drive-wheel motor 114 for operating one or both of the drive wheels 112 such as in response to one or more drive commands or control signals from the controller circuit 109, as well as multiple drive motor sensors 161 such as to facilitate closed-loop control of the drive wheels (e.g., via a suitable PWM technique such as described above). For example, a microcontroller can be assigned to the drive system 110 and configured to decipher drive commands having x, y, and θ components. The controller circuit 109 may issue individual control signals to the drive wheel motor 114. The controller circuit 109 can maneuver the mobile cleaning robot 100 in any desired direction across a cleaning surface such as by independently controlling the rotational speed and direction of each drive wheel 112 via the drive-wheel motor 114.

The controller circuit 109 can operate the drive system 110 in response to one or more signals received from the sensor system 320. For example, the controller circuit 109 may operate the drive system 110 to redirect the mobile cleaning robot 100 to avoid obstacles and clutter encountered while treating a floor surface. In another example, if the mobile cleaning robot 100 becomes stuck or entangled during use, the controller circuit 109 may operate the drive system 110 according to one or more escape behaviors. To achieve reliable autonomous movement, the sensor system 320 may include several different types of sensors that can be used in combination with one another to allow the mobile cleaning robot 100 to make intelligent decisions about a particular environment. For example, the sensor system 320 can include one or more of proximity sensors 336 (such as the proximity sensors 136a-136c), the cliff sensors 134, a visual sensor 325 such as the image capture device 140 configured for detecting features and landmarks in the operating environment and building a virtual map, such as using VSLAM technology, as described above.

The sensor system 320 may further include bumper sensors 339 (such as the bumper sensors 139a and 139b), responsive to activation of the bumper 138. The sensor system 320 can include an inertial measurement unit (IMU) 164 that is, in part, responsive to changes in position or motion of the mobile cleaning robot 100 with respect to a vertical axis substantially perpendicular to the floor. For example, the IMU 164 can senses when the mobile cleaning robot 100 is pitched at a floor type interface having a difference in height, which is potentially attributable to a flooring type change. In some examples, the IMU 164 can include a six-axis IMU having a gyro sensor that can measure the angular velocity of the mobile cleaning robot 100 relative to the vertical axis. However, other suitable configurations are also contemplated. For example, the IMU 164 may include an accelerometer sensitive to the linear acceleration of the mobile cleaning robot 100 along the vertical axis. Output from the IMU 164 can be received by the controller circuit 109 and processed, such as to detect a discontinuity in the floor surface across which the mobile cleaning robot 100 is traveling. The terms "flooring discontinuity" and "threshold" refer to any irregularity in the floor surface (e.g., a change in flooring type or change in elevation at a flooring interface) that is traversable by the mobile cleaning robot 100, but that causes a discrete vertical movement event (e.g., an upward or downward "bump"). The vertical movement event can refer to a part of the drive system (e.g., one of the drive wheels 112) or the chassis of the robot housing 108, depending on the configuration and placement of the IMU 164. Detection of a flooring threshold, or flooring interface, may prompt the controller circuit 109 to expect a change in floor type. For example, the mobile cleaning robot 100 may experience a significant downward vertical bump as it moves from high pile carpet (a soft floor surface) to a tile floor (a hard floor surface), and an upward bump in the opposite case.

A wide variety of other types of sensors may be incorporated in the sensor system 320 (or any other subsystem). Such sensors may be configured to function as one or more of an obstacle detection units, an obstacle detection obstacle avoidance (ODOA) sensor, a wheel drop sensor, an obstacle-following sensor, a stall-sensor unit, a drive-wheel encoder unit, a bumper sensors, or the like.

Examples of Communication Networks

Figure 4A:
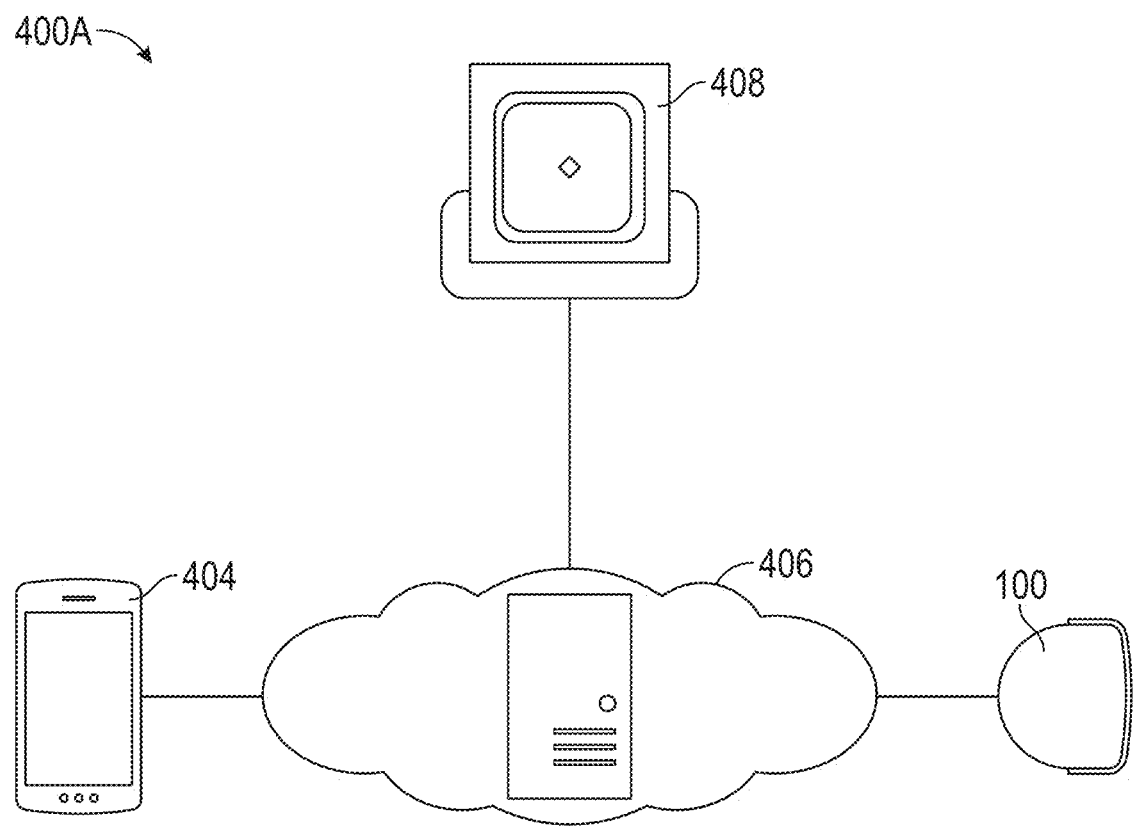
FIG. 4A is a diagram illustrating an example of a communication network in which a mobile cleaning robot operates and data transmission in the network.

FIG. 4A is a diagram illustrating an example of a communication network 400A such as can enable networking between the mobile cleaning robot 100 and one or more other devices, such as a mobile device 404, a cloud computing system 406, or another autonomous robot 408 separate from the mobile device 404. Using the communication network 400A, the mobile cleaning robot 100, the mobile device 404, the robot 408, and the cloud computing system 406 can communicate with one another to transmit data to one another and receive data from one another. In some implementations, the mobile cleaning robot 100, the robot 408, or both the mobile cleaning robot 100 and the robot 408 communicate with the mobile device 404 through the cloud computing system 406. Alternatively or additionally, the mobile cleaning robot 100, the robot 408, or both the mobile cleaning robot 100 and the robot 408 can communicate directly with the mobile device 404. Various types and combinations of wireless networks (e.g., Bluetooth, radio frequency, optical based, etc.) and network architectures (e.g., mesh networks) may be employed by the communication network 400A.

In FIG. 4A, the mobile device 404 can include a remote device that can be linked to the cloud computing system 406, such as can enable a user to provide one or more inputs on the mobile device 404. The mobile device 404 can include one or more user input elements such as, for example, one or more of a touchscreen display, buttons, a microphone, a mouse, a keyboard, or other devices that respond to input provided by the user. The mobile device 404 can alternatively or additionally include immersive media (e.g., virtual reality) with which the user interacts to provide a user input. Examples of such a mobile device 404 can include a virtual reality headset or a head-mounted display. The user can provide inputs corresponding to commands for the mobile device 404. In such cases, the mobile device 404 transmits a signal to the cloud computing system 406 to cause the cloud computing system 406 to transmit a command signal to the mobile cleaning robot 100. In some implementations, the mobile device 404 can present augmented reality images. In some implementations, the mobile device 404 can include a smart phone, a laptop computer, a tablet computing device, or other mobile device.

The mobile device 404 may include a user interface such as can be configured to display a map of the robot environment. Robot path, such as that identified by the coverage planner of the controller circuit 109, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that benefits from repeated cleaning), restricting a robot traversal direction or traversal pattern in a portion of the environment; or adding or changing a zone's cleaning rank, among others.

The communication network 400A can include additional nodes, such as additional robots or additional network-connected devices. For example, a network-connected device can generate information about the environment 20. The network-connected device can include one or more sensors such as to detect one or more features in the environment 20, such as an acoustic sensor, an image capture system, or other sensor generating a signal from which one or more features can be extracted. Network-connected devices can include home cameras, smart sensors, or the like.

In the communication network 400A depicted in FIG. 4A and in other implementations of the communication network 400A, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Examples of Adjacency-Derived Landmark Features

Various examples of systems, devices, and processes of using adjacency-derived landmark features for robot localization and mapping are described in the following with reference to FIGS. 5, 6, 7, 8A and 8B.

The present techniques can use adjacency-derived landmark features, such as for robot localization and mapping of environment. This approach need not rely on an "at-a-distance" sensor. The present approach can include, can build upon, or can be used in combination with one or more of the techniques described in commonly-assigned Vincenti U.S. Pat. No. 9,630,319, entitled LOCALIZATION AND MAPPING USING PHYSICAL FEATURES, which is hereby incorporated herein by reference in its entirety, including its description of robot localization and mapping that need not rely on an "at-a-distance" sensor.

An example of an approach to robot localization and mapping involving an "at-a-distance" sensor is Vision-based Simultaneous Localization And Mapping (VSLAM). VSLAM can involve using a camera onboard the robot as an imaging device, such as to provide a stead-stream of "at-a-distance" visual images of the environment. The visual images can include recognizable or previously recognized "at-a-distance" visual landmarks. Image processing techniques can be used to process these visual images from the camera, such as to extract information about a distance and orientation of the visual landmark with respect to a position or pose of the robot. Such information, including the distance of the visual landmark from the robot and the orientation of the visual landmark with respect to the robot, can be used to determine, from the camera images, a location or pose of the robot within an environment that has been mapped, such that a stored map of the environment includes stored information about the visual landmarks.

The present techniques can involve using an "adjacency sensor" instead of requiring an "at-a-distance" sensor such as a camera or a light detection and ranging (LIDAR) sensor or the like. While using an adjacency sensor can be a cheaper and more efficient approach than using a camera or other "at-a-distance" sensor, it presents a technical challenge of how to perform such localization and mapping without requiring the use of range or distance information that an "at-a-distance" sensor can provide to create or distinguish between distinctive visual landmarks. This document describes ways to use adjacency sensor data and robot motion sensor data to create or recognize adjacency-derived landmark features, such as can be used to perform robot localization and mapping (e.g., using a particle filter back-end) without using an "at-a-distance" sensor, even though the adjacency-derived landmark features being used can in some ways be less distinctive than the visual landmark features such as can be provided by a camera.

An "adjacency sensor" and robot motion information can be used to create landmark features in an occupancy map of the environment, such as from the perspective of the mobile cleaning robot 100 moving about a floor or other base surface of the environment. Such an occupancy map can include or define a grid of square cells of a desired size relative to the robot size. As the mobile cleaning robot 100 moves about the floor or other base surface of the environment, a square in the occupancy map can be deemed "occupied" when the adjacency sensor detects that the robot has bumped into or otherwise encountered an adjacent object located at a particular square. A square in the occupancy map can be deemed "unoccupied" when the robot moves across the square without the adjacency sensor detecting that the robot has bumped into or otherwise encountered an object located at a particular square. Whether a particular square in the occupancy map is occupied, however, is of limited usefulness in robot localization because, by itself, this information provides no distinguishable geometric shape information for an adjacency-sensor generated landmark feature. Instead, each square presents a geometric shape that is identical to, and therefore difficult to distinguish from, every other square in the grid of the occupancy map.

The present approach can use the adjacency sensor data and the robot motion information to detect distinguishable landmark features in the environment—without using a camera or at-a-distance sensor—for potential inclusion in an environment map. A particle filter approach can be used to localize the robot in the environmental map. The localization and map can be used for intelligent navigation of the robot 100 during a mission. In an example, such adjacency-based landmark features can be made distinguishable from each other by permitting different geometric shapes to be associated with individual landmark features, such as straight walls, corners, walls joined at non-perpendicular angles, U-turns, or the like. This can permit individual landmark features to be distinguished from each other by their potentially different geometric shapes. For example, such distinguishable geometric shapes can be created by a path trajectory of a mobile cleaning robot 100, as it "wall follows" a wall or other contiguous obstacle encountered while moving about floor of the environment, such as using a WALL FOLLOWING behavior such as described in the incorporated U.S. Pat. No. 9,630,319. In an example, adjacency-derived individual landmark features obtained during wall-following can include at least two joined straight wall segments, each exceeding a minimum length, and joined by an angle exceeding a minimum threshold angle value.

Such adjacency-based landmark features can be stored in a map, such as an occupancy map, a feature map, or the like. Such adjacency-based landmark features, in turn, can ultimately be used to localize the mobile cleaning robot 100 in the environment that the map represents, such as can include using the particle-filter techniques described herein, optionally in combination with a WiFi signal strength map, such as also described herein. The map can be a persistent map such as can be re-used and optionally modified or augmented during later missions. The mobile cleaning robot 100 can include a sensor system, such as described herein. The sensor system can include a motion sensor to monitor movement of the mobile cleaning robot 100 about the environment. The motion sensor can include one or more odometry sensors, such as described herein, such as to provide odometry data to help monitor movement of the mobile cleaning robot 100 about the environment. The motion sensor can include an inertial sensor, such as an inertial measurement unit (IMU) such as to provide inertial data to help monitor movement of the mobile cleaning robot about the environment. For example, the inertial sensor can include an IMU 164 or another inertial sensor such as can include a gyro or accelerometer, such as described herein. The mobile cleaning robot 100 can include an adjacency sensor configured to receive adjacency sensor data indicating a wall or other object or obstacle in the environment being adjacent to or in contact with the mobile cleaning robot 100—without requiring a camera, or LIDAR or other ranging, or other "at-a-distance" information about remote objects that are not adjacent to or in contact with the mobile cleaning robot 100.

Illustrative examples of an adjacency sensor can include one or more of: a bump sensor 139, an obstacle following sensor 141, a break beam sensor, a capacitive sensor, or other local object detection sensor that can indicate whether an object is adjacent to or in contact with the mobile cleaning robot 100—without requiring using a sensor or sensing modality capable of providing a measurement of how far away a remote object is. The mobile cleaning robot 100 can include a controller circuit 109. The controller circuit 109 can control the drive system 110 to effect movement of the mobile cleaning robot 100 about the floor or other surface of the environment, such as based on one or more of adjacency sensor data, inertial sensor data, or other control input information. Camera or other "at-a-distance" sensors are not required. The controller circuit 109 can also create or recognize distinguishable landmark features. This can include using the adjacency sensor data and motion sensor data to characterize a trajectory path of the mobile cleaning robot 100 as it moves about the floor or other base surface along one or more contiguous walls or other objects or obstacles in a "wall-following" behavior.

The landmark feature candidate can be a wall or other obstacle encountered by the mobile cleaning robot 100 as it moves about the environment. Such an encounter can be indicated by the adjacency sensor. For example, a bump sensor can indicate a location of contact with the obstacle, and a timing between spaced-apart bump sensors receiving such bump contact information can indicate an angle of approach with respect to the obstacle.

Upon making an adjacency encounter with an obstacle, the controller circuit 109 can initiate a wall-following behavior, such as to follow a contiguous surface of the obstacle, and can optionally record an "anchor" representing a start of the wall-following, a stop of the wall-following, or both as endpoint(s) of the observation trajectory path segment associated with that obstacle. Recording such an anchor can include recording one or more of the robot location or pose information associated with the anchor. During the wall-following the mobile cleaning robot 100 can record at least one of its position or its pose recurrently or periodically, such as at 1 cm or similar increments, such as relative to a starting anchor, during the wall-following.

For example, the obstacle can present a straight-wall surface, a curved-wall surface, perpendicular or non-perpendicular corner between surfaces, a U-turn surface, among other trajectory shapes. The characteristic shape defined by the observation trajectory path of the mobile cleaning robot 100 as it travels across a floor of the environment following one or more walls or other obstacles can be used to detect one or more landmark feature candidates, such as can be defined by their corresponding respective individual geometric trajectory shapes. There can be at least two different types of landmark features that can be created for use with re-localization. A first type can include the geometric trajectory shapes from the trajectory path along which the robot moves. A second type can include accumulated hit data from bumps, bump-follows, and wall-follows, which can be accumulate into a point-cloud of hits. That point-cloud can then be analyzed for shapes. For example, this can include using Random Sampling Consensus (RANSAC) or other technique, such as to find consecutive lines then get angle between lines, or to look for shapes like a semi-circle). If you are bump-following a surface, the trajectory path data may be noisy, but the object shape can still be extracted from the point-cloud bump hit data.

The geometric shape of the trajectory path of the mobile cleaning robot 100 as it moves about a floor or other base surface following along the wall or other obstacle can be characterized by one or more geometric shape parameters that can be potentially distinguishable between individual landmark features. Some illustrative examples of such geometric shape parameters of the trajectory path can include, among other things, its length, its curvature, an angle presented by one or more identifiable corners or U-turns, or the like. The geometric shape of the trajectory path of the mobile cleaning robot 100 within an environment or the point-cloud data during wall-following can be used to create an adjacency-based landmark feature that can be distinguished from other adjacency-based landmark features, such as without requiring visual camera or other "at-a-distance" data.

The geometric shape of the observation trajectory path of the mobile cleaning robot 100 from a contiguous wall-following encounter with a landmark feature candidate can be compared with the geometric shape of the trajectory path of one or more stored previously identified landmark features, such as resulting from previous contiguous wall-following encounters. Additionally or alternatively, point-cloud data from bump-following or wall-following along an obstacle can be used.

The adjacency-derived landmark features candidate can be used for robot localization, which can involve using a particle filter technique such as described herein, without requiring using camera or other "at-a-distance" information, optionally augmented by WiFi signal strength map information, such as described herein. Such a particle filter technique can be combined with one or more other localization techniques, such as described herein or as described in the incorporated U.S. Pat. No. 9,630,319.

One or more criteria can be applied to determine whether an adjacency-derived landmark candidate should be stored as a landmark feature in a feature or other map. Illustrative examples of one or more landmark feature candidate characteristics to which one or more criteria can be applied to determine whether to declare an identified landmark feature can include one or more of: a length of the observation path trajectory; a minimum (e.g., at least 30 cm) or other distance of the observation trajectory from one or more previously identified landmark features; an orientation of the observation trajectory; an orientation of the observation trajectory with respect to one or more previously identified landmark features; a path shape of the observation trajectory; a density of identified landmark features near the observation trajectory of the landmark candidate, or the like. For example, a straight wall segment landmark feature can include one or more geometric characteristics. Illustrative examples of such geometric characteristics can include one or more of a length, a starting location, an ending location, and an orientation in the environment.

One or more criteria can optionally be applied, such that identified landmark features can optionally be restricted to those presenting only straight (e.g., linear) wall segments, such as of sufficient length and joined by an angle meeting one or more criteria. Most household rooms have straight walls, and most such straight walls are oriented perpendicular to each other, such that a rectilinear wall-assumption can optionally be made. Such a rectilinear wall-assumption can provide certain benefits to one or more of robot landmark feature creation and recognition, mapping creation or modification, or robot localization.

In deciding whether a particular landmark feature candidate should be declared a newly identified landmark feature, or should be merged with a previously-identified landmark feature, the controller circuit 109 can apply one or more criteria, such as can be rules-based, algorithmically applied, or applied using a trained machine-learning (ML) model. However, such rules need not be based solely on one or more geometric shape characteristics of the trajectory path used to generate the landmark feature. For example, if a landmark feature candidate is too close to a previously-identified landmark feature (or in an area too-densely occupied by previously-identified landmark features), it may have less usefulness as a newly identified landmark feature, because it may not add much value to robot localization over the closely located previously-identified landmark feature(s). Or, if a landmark feature candidate is too short, to declare such a too-short landmark feature candidate to be a newly identified landmark feature might be undesirable. Such a too-short landmark feature candidate may be overly affected by or sensitive to variations in the actual trajectory path taken by the mobile cleaning robot 100 across the floor surface. Thus, such a too-short landmark feature candidate may provide less confidence in any resulting wall-following re-encounter information to be used for robot localization.

In an example, the orientation of a landmark feature candidate, such as with respect to one or more previously identified landmark features, may be useful to determine whether to declare a landmark feature candidate as a newly identified landmark feature. It can be desirable to have a mix of orientations as identified landmark features. This can include a mix of orthogonal orientations, such as when an optional rectilinear assumption is being used. Or, in the absence of such as optional rectilinear assumption, a mix of non-orthogonal orientations can be desirable in a collection of identified landmark features. Similarly, it can be desirable for the collection of identified landmark features to include a mix of joined non-aligned segments, for example, such joined non-aligned segments can define a perpendicular or non-perpendicular corners, a peninsular wall formation with an associated U-turn trajectory-shape, etc.

For example, as a mobile cleaning robot 100 travels about a floor or other base surface of a household or other environment, location or pose coordinates being tracked by the controller 109 of the mobile cleaning robot 100, such as from odometry or other motion sensor data, may accumulate potential positional error. Such accumulated potential positional error—which can also be referred to as offset or drift—may be due to sensor inaccuracy or due to variations in the floor surface or in operating the drive system 110, among other things. Such accumulated potential positional error can be estimated by the controller 109. This potential positional error estimation can be based on specifications of such sensor or drive components, or variations in the floor surface or other events (e.g., including large drift events) encountered during the mission that can cause potential accumulated positional error.

For example, the controller 109 may track distance traveled by the mobile cleaning robot 100 since one or more previous re-localizations. The controller 109 may also optionally track one or more other mission conditions. Such tracked information can be compared to one or more criteria that can be used by the controller 109 to declare when re-localization should be performed based on accumulated estimated error in the location or pose coordinates. When the controller 109 deems re-localization of the mobile cleaning robot 100 to be helpful, it can optionally transition into an active identified-landmark-seeking mode. In such a mode, the controller 109 can actively direct the drive system 110 to move the mobile cleaning robot 100 toward a nearby identified landmark feature. After such travel, upon encountering such an identified landmark feature, re-localization of the mobile cleaning robot 100 can be performed by the controller 109, such as using the particle filter approach described herein.

The present mapping and landmark recognition techniques to help perform "kidnapping" recovery. The term "kidnapping" can refer to an instance in which a user interferes with or affects operation of the mobile cleaning robot 100 as it moves about the floor surface of the environment—such as by picking up the mobile cleaning robot 100 at a first location in the environment, and moving it to and placing it at a different second location in the environment. It can be useful to detect such kidnapping or any other user-repositioning or other repositioning of the mobile cleaning robot from a first location to a second location in the environment that occurs without the drive system of the mobile cleaning robot 100 performing the repositioning.

In response to detecting such kidnapping, it can be useful to perform robot localization to identify one or more of the location and pose of the mobile cleaning robot 100 (e.g., in response to detecting repositioning of the mobile cleaning robot 100). Such robot localization can be performed based on the mobile cleaning robot 100 encountering an identified landmark feature and using stored information associated with the identified landmark feature encountered by the mobile cleaning robot 100, such using the particle filter robot localization approach described below.

Examples of Using Particle Filters for Robot Localization and Mapping

Various examples of systems, devices, and processes using particle filters for robot localization and mapping are described in the following with reference to FIGS. 5, 6A, 6B, 6C, 6D, 7A, 7B, 7C, 8A, 8B, and 8C.

The present techniques can use a particle filter for robot localization and mapping of environment that, such as described herein, need not rely on an "at-a-distance" sensor, such as which can improve upon particle filter techniques described in commonly-assigned Pack et al. U.S. Pat. No. 9,037,396 entitled SIMULTANEOUS LOCATION AND MAPPING FOR MOBILE ROBOT; and Schnittman U.S. Pat. No. 9,020,637 entitled SIMULTANEOUS LOCATION AND MAPPING FOR MOBILE ROBOT, each of which is hereby incorporated herein by reference, including for its description of particle filter techniques, such as for robot localization and mapping. Instead, the particle filter approached described herein, can use adjacency-sensor derived landmark features, such as can be stored in a map, such as described above, and in the above incorporated Vincenti U.S. Pat. No. 9,630,319.

Figure 5:
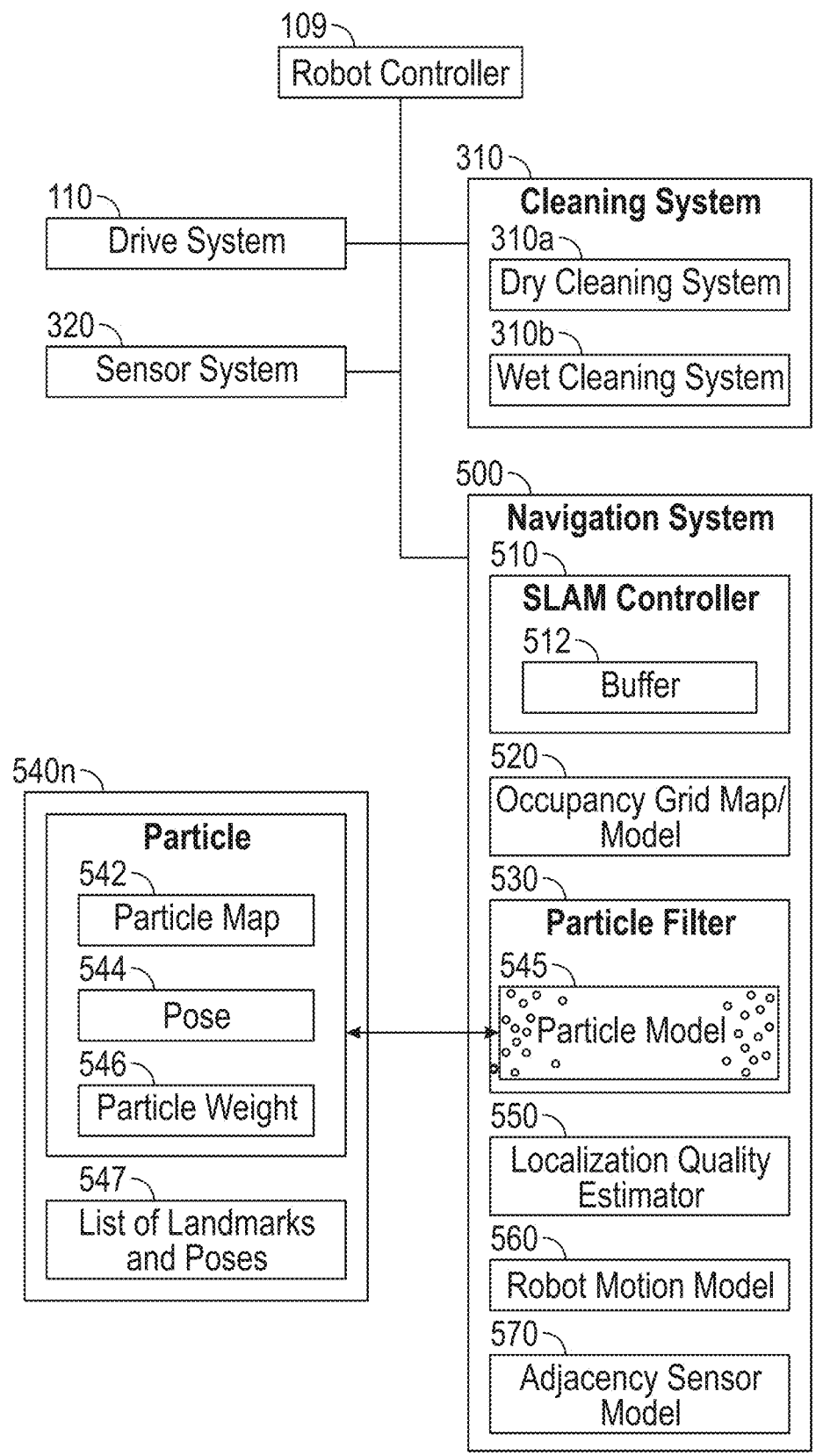
FIG. 5 is an example of portions of an implementation of the mobile cleaning robot, such as which can execute a particle filter approach to robot localization or mapping.

FIG. 5 is a schematic diagram example of portions of an implementation of the mobile cleaning robot 100, such as which can execute a particle filter approach to robot localization or mapping—without requiring a steady stream of visual images from a camera or other "at-a-distance" sensor. As an overview, a "particle" can include an odometry and adjacency-based map, and a weighted hypothesis of a robot position inside the map. Each particle can have its own corresponding map representing its own world view. When the robot 100 moves about the environment, the amount of motion its odometry reports can be fed into the particle filter as the mean or central tendency of a Gaussian or similar statistical distribution. That Gaussian distribution can be sampled for each particle, such that each particle's hypothesis of robot position can get a unique motion applied to it. Thus, when the robot gets odometry sensor data, such as during a wall-following localization mode, its control circuitry can compare such sensor data to what the map looks like around the particle's hypothesized robot position in the particle's map and can assign the particle a probability or weight based on how closely such sensor data matches expectations corresponding to that particle's map. The particle filter can re-sample particles based on their probability weighting, and less likely particles can be sampled out and replaced with maps of more likely particles. The process of building the maps can continue with all particles building against the maps deemed most likely based on the sampled distribution of odometry motion sensor data.

In the more detailed example of FIG. 5, the controller 109 can include or be coupled to a navigation system 500. The navigation system 500 can include a Simultaneous Location And Mapping (SLAM) controller 510. The SLAM controller 510 can be configured to include a particle filter 530. The particle filter 530 can include a particle model 545. The particle model 545 can be made up of a set of particles $540_1 \ldots 540_n$. Each particle 540 can represent a hypothesis of a location or a pose P of the robot 100 in its environment. Each particle 540 can build its own associated map data, such as can use odometry or other motion sensor data together with adjacency sensor data.

Thus, each particle 540 can have an associated stored particle map 542, robot pose P or location 544, particle weight 546, and list of landmark features 547 (and associated pose and landmark characteristics). For example, the particle map 542 may include one or more maps associated with each particle, such as can be created during mapping and used during localization; such maps may include at least one of a feature map, a variance occupancy grid map, or a ground plane occupancy grid map, for example. Each particle 540 may represent a hypothesis, in terms of its associated map 542 and robot pose or location 544, of the location of the robot 100 with respect to its surroundings. The SLAM controller 510 can score and assign a particle weight 546 to each corresponding particle 540.

The pose P or location in space (e.g., x, y, θ, in Euclidean planar space) of the robot 100 usually changes in time. Therefore, data aggregation may involve referencing spatial measurements back to a common datum. A SLAM algorithm can estimate a new pose P of the robot 100 based on the commanded motion of the robot 100 and motion sensor and adjacency sensor data from the robot 100—without requiring distance information from visual images in a scene provided by a monocular or other camera or other "at-a-distance" ranging information. For the pose distribution (probabilistic estimate of the true robot location) to converge without using distance information extracted from camera-provided visual images, additional challenges are presented by the ambiguity of relying on motion sensor and adjacency sensor data from the robot 100 for executing the particle filter 530. However, it is still possible to configure the particle filter 530 to operate to allow the robot 100 to determine if it is near an adjacency-based identified landmark feature, such as a wall or a corner, and even which particular adjacency-based identified landmark feature the robot 100 is near. Examples of using an adjacency sensor for identifying landmark features for inclusion in a map are described herein, such as above and in the above incorporated Vincenti U.S. Pat. No. 9,630,319.

Also, as described further below, it is possible to augment the particle filter with WiFi signal strength map information, as opposed to using a visual "at-a-distance" sensor, such as a camera, or as opposed to using an optical "at-a-distance" sensor, such as LIDAR, or as opposed to using an acoustic "at-a-distance" sensor, or as opposed to using another "at-a-distance" sensor from which information about a physical distance between the robot and a physical object is extracted.

The navigation system 500 may employ data aggregation. Data aggregation is a technique that can be used to construct a single or other unified dataset from groups of data collected across different sensor types (e.g., tactile sensors, proximity sensors). Such data aggregation need not require using information from a camera or other "at-a-distance" sensor. Data aggregation can also be used to construct unified data at various times when acquired sensor data may be sparse. This may result from sensors with low spatial resolution, slow update rates, or the like. In an example, the SLAM controller 510, with data aggregation enabled, can aggregate sensor readings across sensors (e.g., motion sensor data, such as from odometry or IMU sensors, adjacency sensor data, such as from wall-follower proximity sensors, bump sensors, beam-break sensors, or the like) across time. For example, as the robot 100 moves forward, the odometry sensors can capture distance-travelled data and IMU data. While this is less information and more ambiguous information than distance information that can be extracted from visual images provided by a camera, the particle filter 530 can still be configured to operate in a manner that can use such more ambiguous data such as to extract a robot localization hypothesis.

The SLAM controller 510 can update the map 520 on a periodic or other recurrent basis, such as after travelling a threshold distance (e.g., once every meter or half meter travelled by the robot 100), after a threshold period of time (e.g., once every 1-3 seconds), or after collecting a threshold amount of data (e.g., greater than 20 points). To aggregate across time the SLAM controller 510 can store sensor measurements as travelled distance and bearing pairs, along with a best estimate of the robot's pose P (x, y, and θ measurements of the robot's center to an arbitrarily oriented coordinate system established when the particular run began).

The SLAM controller 510 may accumulate one or more of motion sensor and adjacency sensor data in a data buffer 512 (e.g., non-transitory memory), such as until it has acquired a specified amount. During the data accumulation period, the position or pose P of the robot 100 can become less and less well-known, since the robot 100 continues to move, which adds potential uncertainty. Once the data buffer 512 is full or reaches a threshold capacity, the SLAM controller 510 can process the buffered motion sensor or adjacency sensor data as a group. The SLAM controller can update the map 520 and, if enough potential error has accumulated, can initiate a localization mode to correct the robot's position or pose P. The SLAM controller 510 may balance a cost in increased accumulated error from moving against a correction accuracy gain that can be obtained by initiating the localization mode to perform the localization. For example, the SLAM controller can 510 can process the buffered motion sensor or adjacency sensor data after traveling for a threshold distance or a threshold time, rotating through a threshold orientation angle change, or for collecting a threshold amount of motion sensor or adjacency sensor data.

The trigger for processing data may also be dynamically based on one or more other measures of the system (e.g., a current confidence of the localization of the robot 100, availability of nearby adjacency-based identified landmark features, etc.). Optionally, the SLAM controller 510 can execute the particle filter 530 in a manner that keeps particles 540 that sufficiently match the map 520 and drop particles 540 that do not. The SLAM controller 510 may execute a matching routine, such as can compute how well a given particle 540 matches the map 520.

The navigation system 500 may include a localization quality estimator 550 such as for determining a confidence in the ability to use nearby adjacency-based identified landmark features for localization of the robot 100. Rather than assuming that nearby adjacency-based identified landmark features will be helpful in improving the robot's localization or the building of the map 520—which may be true when the available nearby adjacency-based identified landmark features are sufficiently close, are appropriately oriented or shaped, are sufficiently dense, and generally accurate—the SLAM controller 510 may receive a confidence level of the ability to perform robot localization from the localization quality estimator 550 before making any such determination. Unlike a particle-filter-based localization approach based upon range data from visual images provided by a camera, a particle filter 530 performing localization may configure the a localization quality estimator 550 to constrain movement of the robot 100 in a manner that preserves availability and access to an appropriate one or more adjacency-based identified landmark features to correct one or more components of accumulated potential error during travel.

In some implementations, in addition or alternative to using the accumulated potential error indicated by the odometry or other motion sensor data, the localization quality estimator 550 can use the particle weights 546 to help estimate if the robot 100 has become delocalized. This can include determining an average particle weight 546 for the particles 540 of the particle model 545 (or a subset thereof) such as to help provide an estimate of localization quality Q. If the robot 100 is well-localized the average weight 546 is high, otherwise the average weight 546 is low. The localization quality estimator 550 may apply one or more filters such as to help smooth out the determination. The localization quality estimator 550 may estimate an instantaneous localization of the robot 100 (e.g., the localization quality according to the data available from the particle filter weights 546, from the odometry or other motion sensor data, or both) such as by processing one or more components of the instantaneous localization through separate low-pass or other filters (e.g., with respectively tailored cutoff frequency or other characteristics) and comparing or combining the output signals provided by the filters, such as by computing a ratio, or the like. The localization quality estimator 550 may then put the instantaneous localization results through a leaky integrator, such as to estimate a stable localization. When the output value of the integrator is above a specified threshold, then the robot 100 can be considered to be well localized.

The SLAM controller 510 can update particles 540 in the particle model 545, such as using a robot motion model 560. The robot motion model 560 can model movement of the robot 100. This can include modeling a corresponding measurement error of the robot 100. Using motion sensor data, such as odometry or IMU data, the robot motion model 560 can model motion (e.g., travel distance and/or travel path) of the robot 100. Due to drive wheel slip, encoder tolerances, etc., the measured odometry data may include an error term. For example, if the robot 100 rotates 90° and translates one meter, the measured odometry may potentially be off by +/−10° of rotation and +/−5 cm of translation. Moreover, the IMU 164 may have a different error, such as depending on its method of measurement (e.g., gyro). The robot motion model 560 can be a Gaussian error model, such as can be centered on a travel vector derived from motion sensor data, such as from odometry and/or IMU data, where some portion of the Gaussian curve can represent noise. The Gaussian error model may include a dynamic error model, such as may include one or more model control parameters that can depend on an operating characteristic. For example, an error model control parameter can be based on one or more aspects of the odometry or previous localizations, such as whether the optical mouse is believed to be tracking (which may depend on the particular floor surface, e.g., carpet or hard floor, or may depend on one or more transitions between different types of floor surfaces). The Gaussian error model may individually model separate motion error components (e.g., slippage error component, drift error component, translational error component, rotational error component) using separate error model components, such as to which Gaussian noise can be individually added for generating particles for use by the particle filter. A joint probability of motion error components or one or more other factors (e.g., WiFi signal strength, such as described herein) can be used to combine individual probabilities such as for particle generation.

The SLAM controller 510 may receive an input of motion sensor data and adjacency sensor data. From the individual pose 544 (position hypotheses) of the particles 540, the particle filter 530 may select the hypothesis of the particle 540 having the highest weight 546 as a best pose 544 for the position hypothesis of the robot 100 at a current time. The robot controller 109 can use the pose 544 or position hypothesis of the selected particle 540 and its associated particle map 542 such as to determine a way point for issuing a drive command to the drive system 110. In this way, the robot controller 109 can use the particle map 542 of the selected particle 540 to navigate at that given moment in time. For example, if the robot 100 has a drive goal to drive from a first room to a second room, the navigation system 500 may record information associated with a selected particle 540 (e.g., position hypothesis and/or maps) at a time of drive command issuance, and can perform localization temporarily of that particular particle's hypothesis and that particular particle's particle map 542.

The SLAM controller 510 may update the particles 540, such as in a probabilistic manner, such as using the robot motion model 560. The robot motion model 560 provides a probability distribution of new positions to which the robot 100 may have moved (e.g., based on odometry and/or an IMU 520). For example, if the SLAM controller 510 estimates that the robot 100 moved forward one meter, but with some error in that movement, rather than updating all of the particles 540 by moving them all forward one meter, for each particle 540, the SLAM controller 510 can generate a sample. The sample can be generated based on a position distribution of the robot motion model 560 centered on, for example, one meter of forward movement with a threshold variance (e.g., 10%). A first particle $540_1$ may receive a sample of 0.9 meters of forward movement. A second particle $540_2$ may receive a sample of 1.1 meters of forward movement. A third particle $540_3$ may receive a sample of 1.05 meters of forward movement, and so on. In this way, each particle 540 can receive its own sample based on the position distribution. The SLAM controller 510 can update each particle 540, such as for motion based on its received sample.

The SLAM controller 510 may be configured such as to build the map 520 only when the robot 100 is well localized (e.g., has a good confidence of its location). If the robot 100 is not well localized, the navigation system 500 may cause the controller 109 to issue a drive command to maneuver the robot 100 to a nearby adjacency-based previously identified landmark feature, such as in contact with a wall or corner, such as to localize the robot 100 with respect to that identified landmark feature. Moreover, to improve localization, the navigation system 500 may execute path planning for a path to engage in wall-following of the nearby adjacency-based previously identified landmark feature, or to direct the robot 100 toward a secondary adjacency-based previously identified landmark feature for localization confirmation or improvement.

If the robot 100 becomes lost, it may trigger a localization mode that can be initiated by first executing a behavior that moves the robot 100 in a manner (e.g., spiral movement, linear movement, etc.) that probabilistically will tend to find an object, such as a wall. The robot 100 may then execute the wall-following behavior to follow the wall to re-localize, such as using the adjacency sensor data and the motion sensor data described herein.

In an example, during an initial phase of, or intermittently during, or throughout a localization mode or a mapping mode, or both, such as after finding an object such as a wall to follow, the navigation system 500 may cause the controller 109 to issue a drive command to maneuver the robot 100 in a "loop closure" phase or mode. In the loop closure phase or mode, navigation tending to favor one or more paths forming closed loops is preferred, since using such closed-loop paths can help speed convergence or improve the quality of robot localization or mapping or both, such as using a particle filter approach such as described herein. As an illustrative example of such a loop-closing preference, if the robot is in a room with three contiguous walls and a single door providing entrance to and exit from that room, if the three walls are encountered, such that there is only a short path (e.g., an open doorway width) left for the robot to traverse to "close the loop" of that room, then the navigation system 500 may cause the controller 109 to issue a drive command to maneuver the robot 100 to do so, instead of to turn and exit the room via the open doorway. This "loop-closing" preference can help speed convergence or improve the quality of robot localization or mapping, or both, and can be carried out in one or more or all of the rooms in the environment.

Such loop closure can help allow the robot to distinguish the particles that correctly model the structure of the environment from those that do not, such as when the robot revisits the beginning of the loop. During such a re-visit of the beginning of the loop, the robot can re-observe the same area and can compare the windowed accumulation of sensor data to the cell types in the map (e.g., cliff, wall, or other adjacency-determined feature) at the robot's position in the map. This allows the robot to capture the correct structure for robot localization before the accumulated uncertainty grows too large and the particle filter no longer has a hypothesis that correctly models the environment. This can be especially useful in an adjacency sensor approach, with the more limited information it provides as compared to a camera or other "at a distance" approach, as in an adjacency sensor only approach, the robot does not have the ability to reinforce the environment's structure by observing walls and features at a distance.

Using the environment structure mapping established during the loop closure phase, the robot can opportunistically reinforce its localization certainty during a mission, such as by employing a coastal navigation approach when navigating to one or more goals. For example, coastal navigation techniques can be used to find one or more areas of the map that can provide rich information for the adjacency sensor based position model. Such rich information can include a landmark feature, such as a wall, and to path plan and navigate in a manner that can encourage the robot to observe that information, such as by wall following in general on the way to its destination (not necessarily associated with landmarks.) This can be accomplished by planning a path to the next goal and then checking whether there is a wall parallel to a portion of the path direction that is nearby, so the robot can opportunistically follow it. Following walls in general, even if there aren't landmarks associated with them, gives the robot more sensor data to match against the map to help the particles 540 correctly weight themselves against their map consistency. This can be used if the robot has uncertainty about its position (such as during mapping or for the short kidnap case), but need not be used if the robot is totally lost, in which case it would just find the closest wall given that it cannot plan a path because it doesn't know where it is.

In an example, the robot may include more than one localization mode. For example, a particular localization mode can be selected from multiple available localization modes depending upon an uncertainty level or other indication indicating an estimate by the controller 109 of "how lost" the robot is. In an example, there may be at least two different starting conditions, which can trigger different localization behavior.

A first starting condition may have relatively more limited uncertainty (e.g., uncertainty greater than a first threshold value but less than a second threshold value). Such a limited uncertainty first starting condition can occur, for example, when the robot is starting a new mission on its dock in a previously-mapped environment, or after a "short-kidnap" in which the robot is picked up and put down by a user for a short duration, such that it can be inferred that the robot was carried by the user, if at all, only a limited distance during the short kidnap, such that appropriate bounds on the robot location can be estimated or inferred, at least for the purpose of assigning or weighting particles or corresponding hypotheses used by the particle filter.

A second starting condition may have relatively more uncertainty than the first starting condition (e.g., uncertainty less than both the first and second threshold values). This can occur, for example, where there is no dock-based or other starting hypothesis, or after a "long-kidnap" in which the robot is picked up and put down by the user for a longer duration, such that it can no longer be inferred how far the robot was carried by the user during the long kidnap, such that appropriate bounds on the robot location can no longer be estimated or inferred for the purpose of assigning or weighting particles or corresponding hypotheses used by the particle filter.

Figure 8C:
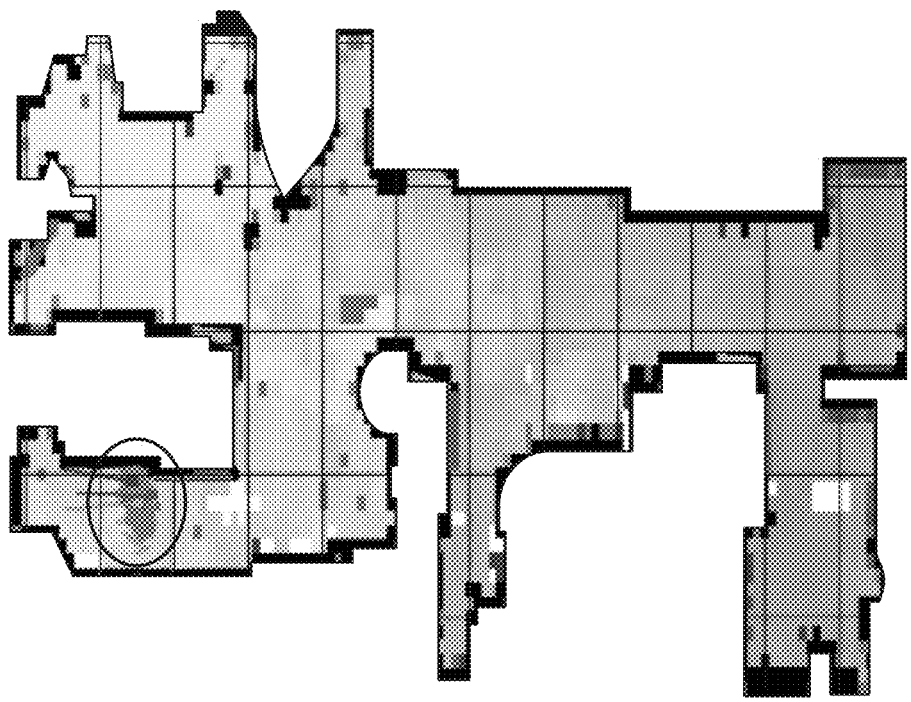

For the second starting condition (higher uncertainty), a resulting localization mode can be triggered in which the controller 109 commands the robot 100 to drive without a particular destination goal location targeted, but to instead to drive until a wall or other obstacle is encountered and detected by the adjacency sensor (such as to drive in a straight path, spiral path, etc., without planning a path to any particular destination location. Upon encountering the wall or other obstacle, it considers such a wall or obstacle a "landmark candidate" and begins wall following behavior. During the wall-following behavior, adjacency-derived trajectory or point cloud data can be accumulated. The particle filter can be seeded with particles and corresponding hypotheses sufficiently matching data obtained from at least one of WiFi signal-strength or from previously identified adjacency-derived landmark features as landmark feature candidates are encountered during the wall following of the first landmark feature candidates or other subsequent landmark feature candidates (see, e.g., FIG. 6A), such as during a loop-closure phase or other behavior during which wall-following is directed toward a perimeter of the room in which the robot is located. This localization mode can continue until an adjacency-derived landmark feature is observed, and the particle set updated accordingly, such that a consensus hypotheses of a robot location emerges among a specified proportion of the particles (e.g., a vast majority, such as 80%). An example of such a consensus hypothesis emerging is shown in the transition from FIG. 6B to FIG. 6C, described further below. A best particle of the consensus group of particles can be selected and the robot can be localized accordingly with the best particle chosen as the central position hypothesis (with some uncertainty distributed around it) for transitioning the robot out of this localization mode and into a cleaning or mapping or other mission mode, such as shown in FIG. 8C, described further below.

For the first starting condition (lower uncertainty) a resulting localization mode can be triggered in which the controller 109 commands the robot 100 to drive toward a particular destination goal location targeted, such as to an estimated location at which a nearest identified landmark is believed to exist, albeit with some uncertainty, such as resulting from the short kidnap or any other cause of such more limited uncertainty that may merit re-localization of the robot. In this localization mode, instead of the controller 109 commanding the robot 100 to drive without a particular destination goal location, the controller 109 can command the robot to plan a path toward the estimated location (given the uncertainty) of the nearest identified adjacency-derived landmark feature. On its way to such estimated location of the nearest identified landmark, coastal navigation can be employed to trigger opportunistic wall following of any walls or obstacles encountered on the general path toward the destination goal location of the nearest identified adjacency-derived landmark feature. Such wall following during coastal navigation can be used to seed or update the particles and corresponding hypotheses for use by the particle filter, to help reduce uncertainty, possible even to a degree such that one or more criteria can be achieved en route and robot localization can occur without re-confirming using the targeted nearest identified landmark. Otherwise, if the targeted nearest identified landmark is encountered, it can be wall-followed as a landmark candidate to confirm whether a sufficient match exists to the targeted nearest identified landmark and, if so, particles can be seeded, updated, or both, and robot localization can occur. Otherwise, a planned path to a next identified landmark feature as a destination goal can be employed, unless the uncertainty has increased to a sufficient degree to trigger the higher uncertainty localization mode, which can be initiated in such case. For successful localization, such as against a landmark or by a high degree of correlation with the map for a defined period of travel, a consensus hypotheses of a robot location emerges among a specified proportion of the particles (e.g., a vast majority, such as 80%, or a different criterion). An example of such a consensus hypothesis emerging is shown in the transition from FIG. 6B to FIG. 6C, described further below. A best particle of the consensus group of particles can be selected and the robot can be localized accordingly with the best particle chosen as the central position hypothesis (with some uncertainty distributed around it) for transitioning the robot out of this localization mode and into a cleaning or mapping or other mission mode, such as shown in FIG. 8C, as described below.

In either or both such localization modes, when wall-following a landmark, the controller 109 can monitor its perimeter or area for small loops, e.g., falling below a specified minimum perimeter or a specified minimum area, from which it can be inferred that the robot is wall-following about an island, instead of loop closing about a perimeter of a room. If so, the controller 109 can direct the robot 100 to travel to its entry point at which the island was encountered, e.g., using its traversal history, and can direct the robot 100 to exit the island on the other side of its entry point, such as to find a different obstacle to follow.

When the SLAM controller 510 is sufficiently confident that the robot pose P is known, it may transition to a cleaning mission mode or other mission mode, such as a map-building mode to build or augment the map 520, such as using the adjacency sensor data and the motion sensor data to add occupancy probabilities to the occupancy grid map/model 520. However, if the SLAM controller 510 is not confident in the robot's localization, it may disable modifying or updating the occupancy grid map/model 520, and may remain in a localization mode, engaging in wall-following behavior and the like. This technique can cause the map 520 to become frozen in the last known-good state and to remain that way until the robot 100 is able to regain a high-quality estimate of its position (pose P), at which time the SLAM controller 510 may resume adding occupancy data to the map 520. However, during the localization mode, the motion-sensor and adjacency data may be used to build an alternative map, such as by locating landmark feature candidates for use as identified landmarks in the alternative map. Then, when sufficient confidence in localization of the robot is obtained, the SLAM controller 510 can determine whether to merge one or more or all aspects of the alternative map with the previous map 520, or to replace the previous map 520 with the alternative map.

In short, this technique helps prevent the system from destroying or corrupting or losing a perfectly good map 520 due to what would otherwise be a temporary loss of localization. If the map 520 becomes significantly corrupted it may be very difficult, if not impossible, to localize the robot 100 successfully.

The SLAM controller 510 may execute selective resampling. Resampling may occur after the SLAM controller 510 processes all of the motion sensor data and adjacency sensor data and computes a weight 546 for each particle 540 in the particle model 545. The particle weight 546 of a particle 540 can be based on a degree of agreement between its corresponding particle map 542 and the adjacency sensor data collected from the adjacency sensor. Resampling can be an evolutionary process in which strongly weighted particles 540 are more likely to be selected into a new particle population or particle model 545 than weakly weighted particles 540. For example, resampling can occur on each cycle of the SLAM algorithm.

When executing with sparse adjacency sensor data (and noting that adjacency sensor data is by nature more sparse than range data continuously obtained from a stream of visual images that would be provided if a camera were present), the SLAM controller 510 may find it difficult to distinguish strong particles 540 from weak particles 540 in some cycles of the SLAM algorithm. At such times, the shape of the particle weight distribution may be relatively flat. Thus, resampling may be unhelpful. In some instances, resampling may be harmful in such a situation, because weak particles 540 have a greater chance of replicating than they should, and strong particles 540 have a lesser chance of replicating than they ought to. A solution to this problem is to resample only when there is adequate difference in the weighting of the particles 540 that make up the particle model 545. When there is not enough differentiation, the resampling step can be skipped, and the rest of the algorithm can continue as usual.

Another solution is to resample the particles using a contribution to particle weighting that can be provided by a Wi-Fi signal strength map, in addition to the map constructed from motion sensor data and adjacency data, such as described herein. An example of using Wi-Fi signal strength for robot localization and mapping is described in Chambers et al. U.S. Patent Pub. No. 2018/0321687 entitled METHODS, SYSTEMS, AND DEVICES FOR MAPPING WIRELESS COMMUNICATION SIGNALS FOR MOBILE ROBOT GUIDANCE, which is hereby incorporated herein by reference in its entirety. Such Wi-Fi signal strength can be used for augmenting of a map constructed using motion sensor data and adjacency data, or can be used to construct a separate Wi-Fi map, or can even be used to construct a separate Wi-Fi map for each particle 540, which can also be applied to help assign or constrain particle weights, such as to help appropriately reduce the weight of weak particles, to help appropriately increase the weight of strong particles, or both, such as based at least in part on Wi-Fi signal strength.

If the SLAM controller 510 encounters a long period of time without resampling, as may occur if the model were to become significantly damaged, the SLAM controller 510 may replace large portions of the particle distribution with random particles 540 (or particles seeded and placed with intelligent bias based on some characteristic of the model or on certain sensor data).

FIGS. 6A, 6B, 6C, and 6D illustrate an example of the robot 100 operating in a localization mode in which the navigation system 500 included in or coupled to the controller 109 is executing the particle filter 530 to generate particles 540 in the localization mode. In each of FIGS. 6A-6D, the left-side illustrates a position of the robot 100 within a mapped household environment, and the right side illustrates the map showing the location of particles 540 being generated as the robot 100 engages in wall-following behavior during the localization mode, including as the robot 100 encounters previously-identified adjacency-derived landmark features stored in a map, such as a feature map or an occupancy map.

As an overview, during kidnap recovery or other localization mode in which a pre-existing map exists, the robot can start by wall-following. This can involve steering the robot, such as using coastal navigation, until a wall is encountered and sensed using the adjacency-sensor. Upon sensing the wall, the robot can be commanded to engage in WALL FOLLOWING behavior to follow along the wall with the wall on a particular designated side (e.g., right side) of the robot. While the robot is wall following, it can detect adjacency-derived "features" in the map. In an example, such adjacency-derived features can include two consecutive straight line walls that are at least 0.7 meters long with an angle greater than 45 degrees between them. When the adjacency sensor of the robot detects a feature, it can initialize hypotheses compatible with that particular detected feature (which may or may not be unique, by itself), such as by sampling a Gaussian distribution of odometry data and creating particles 540 representing all instances that are consistent with an approximate match to that encountered feature in the map. The robot continues wall following and, if it gets to a second feature and a significant proportion of the particles are consistent with a match indicating that the robot is located next to that second feature, and if a two-feature identification sequence rule is being applied, the robot can consider itself to know where it is, and can transition out of the localization mode into a cleaning or other SLAM mission mode, such as which may involve using fewer particles for particle-filter-based SLAM navigation than were used for particle-filter-based localization. Otherwise the particle filter can continue adding into play particles that are sufficiently consistent with corresponding adjacency-derived features at or near locations associated with such corresponding features as they are encountered during further wall-following and further localization.

Figure 6A:
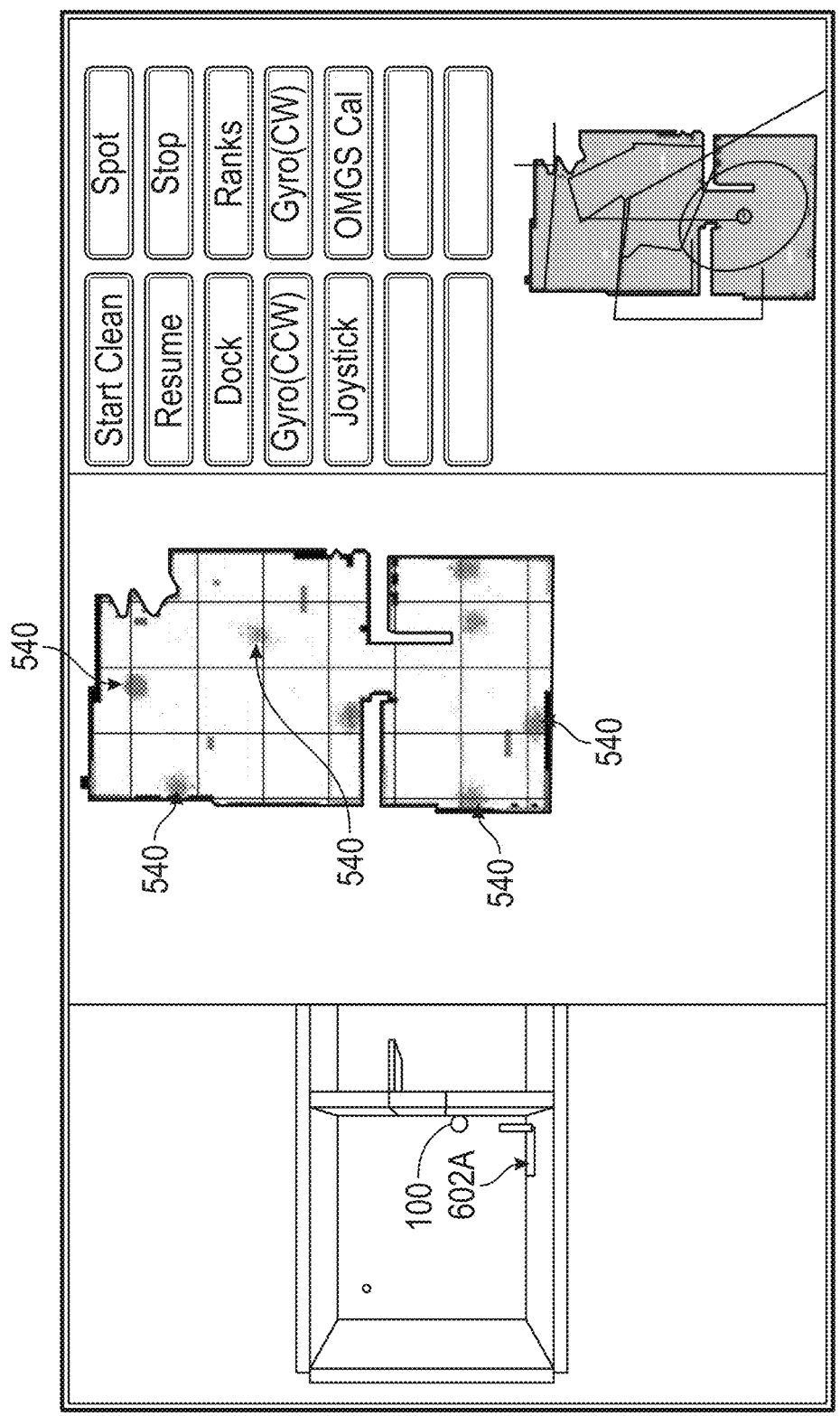
FIGS. 6A, 6B, 6C, and 6D illustrate an example of a robot operating in a localization mode in which a navigation system can execute a particle filter to generate particles, including such as in a robot localization mode.

In the illustrative use-case example shown in FIG. 6A, operating in the localization mode, the robot 100 has wall-followed the wall toward the bottom of FIG. 6A, from the left side of the room to the right side of the room, and turned a corner 90 degrees to the left, moving upward along the page. In so doing, the robot 100 encountered a first previously identified landmark feature 602A—a corner, resulting in the 90 degree leftward turn, as shown. However, because the environment includes multiple such adjacency sensor-based corner features, there remains some ambiguity as to what the actual location of the robot 100 is. This is indicated in the right side of FIG. 6A by the multiple clusters of particles 540 then existing that constitute consistent hypothesis with the robot location based on information then available during the localization mode before recognition of the identified landmark feature 602A.

Figure 6B:
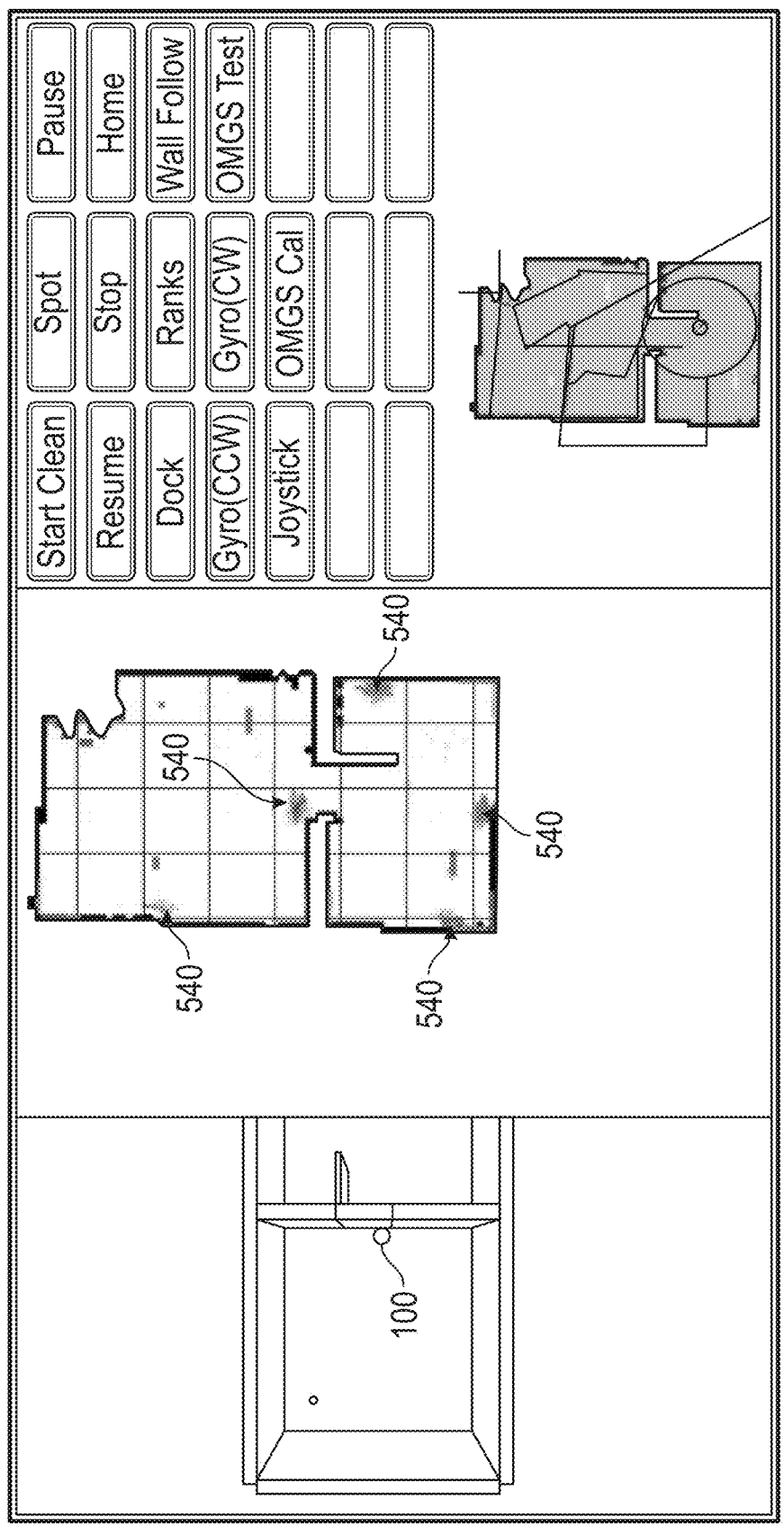

FIG. 6B shows an example of particle filter 530 resampling showing different clusters of particles 540 existing during the localization mode after recognition of the identified landmark feature 602A (90 degree left-turn corner).

Figure 6C:
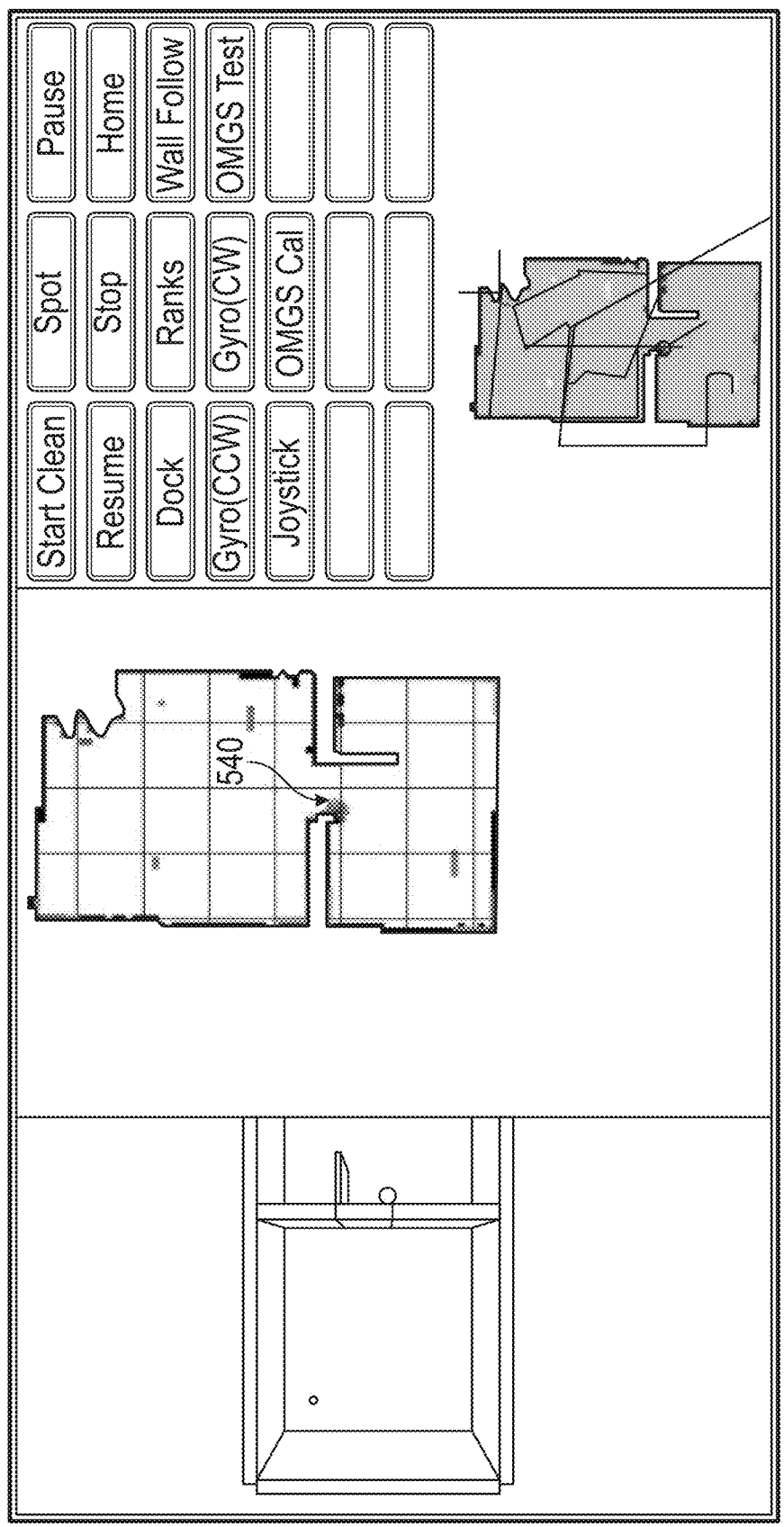
Figure 6D:
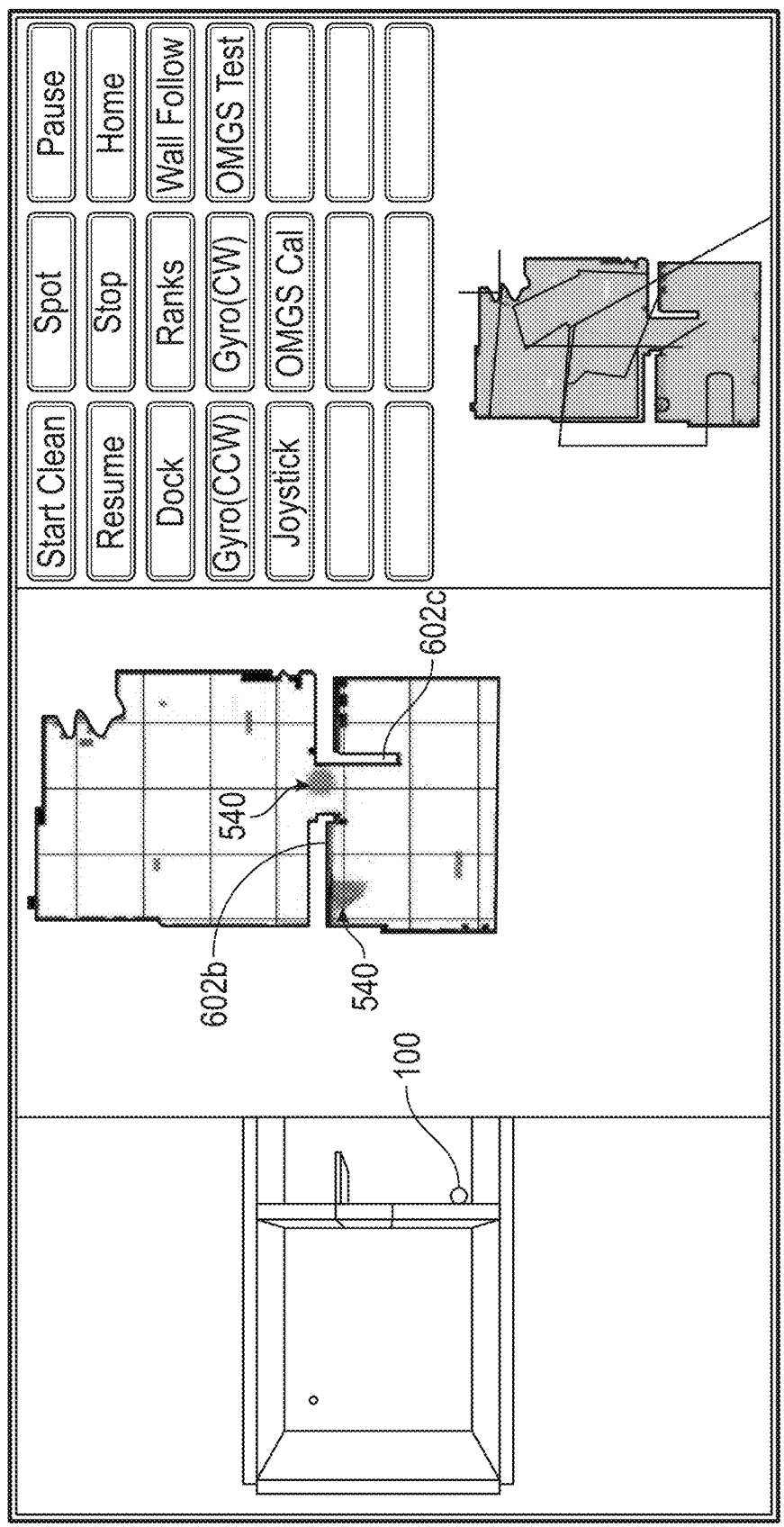

FIG. 6C shows the robot 100 wall-following around a 180 degree "U-turn" of closely-spaced first and second 90 degree right-hand turns, with the robot 100 shown then wall-following along a wall downward on the page. Resampling using the particle filter 530 has removed from play clusters of particles inconsistent with such a U-turn feature 602B (comprising two closely-spaced 90 degree right hand turns) and has left in play previous particles 540 that are consistent with such a U-turn feature 602B.

FIG. 6B shows the robot 100 after the U-turn feature 602B has been identified, with an additional cluster of particles 540 having been introduced into play—because there is more than one possible sequence of a left-hand 90 degree turn followed by a U-turn feature of two closely-spaced right-hand turns (see also 1002C) presented by other walls in the mapped environment. This situation is an illustrative example of increased ambiguity that can be imposed upon a particle filter by using adjacency-based identified landmark features on a map, instead of using distance information that can be provided on an ongoing basis from a stream of visual images from a camera.

For this reason, the particle filter 530 may be configured to include or apply a rule, or otherwise require encountering a unique sequence of two or more adjacency-based identified landmark features before sufficient confidence in the robot location can be declared, such that the robot can transition out from its localization mode into a cleaning or other mission mode. Such a sequence rule may also utilize, as part of the rule, information about the distance between identified landmark features in the sequence, such as can be provided by odometry or other motion-sensor data, without requiring ranging or other "at-a-distance" information requiring a camera, LIDAR, or the like.

For the example shown in FIGS. 6A-6B, identifying such a unique sequence of adjacency sensor derived identified landmark features can involve the robot continuing downward along the page, such as shown in FIG. 6B, and then making a 90 degree left turn, after which resampling can eliminate from play the right-hand group of particles 540 that had still remained when identified feature 1002c was still a possibility. Then, sufficient confidence in the robot location can be declared, and the robot 100 can be transitioned out from a wall-following robot localization mode and into a mission mode. The mission mode can continue until sufficient uncertainty in the robot's position ("drift") accumulates, at which time re-localization can be initiated, either using the particle filter technique, or another motion-sensor and adjacency-sensor based localization technique. If the robot is "kidnapped" by a user (e.g., the user intervenes to pick up the robot and put it down at an unknown position, as opposed to the robot's drive mechanism driving the robot between such positions) the particle filter based localization mode can be re-initiated, such as with random or other seeding of particles 540, for example, such as can be based upon Wi-Fi signal strength.

Figure 7B:
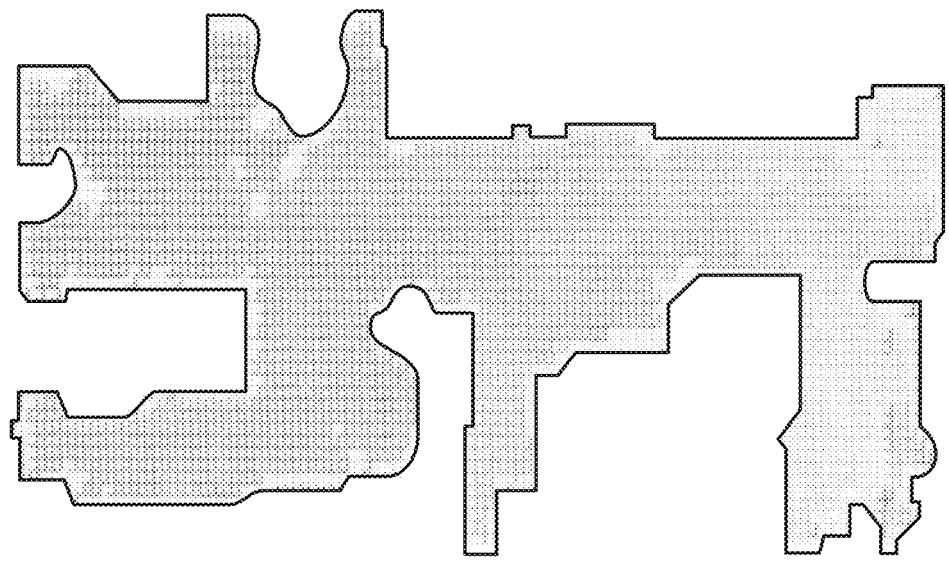
Figure 7A:
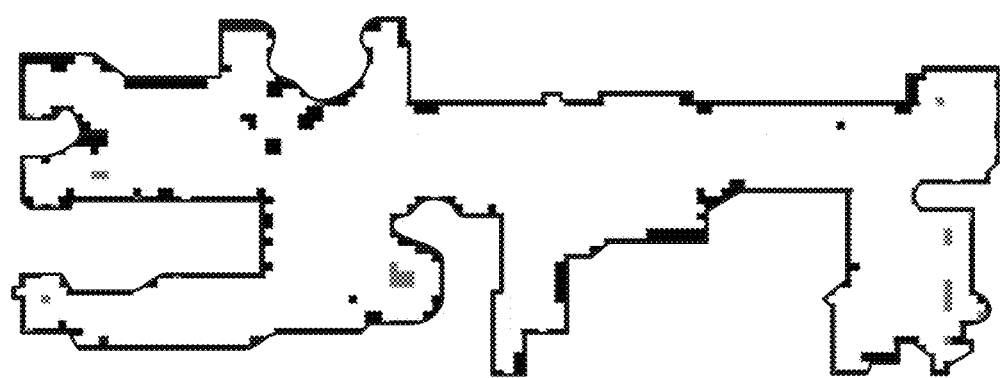

For example, FIGS. 7A, 7B, and 7C show examples of maps associated with an example that can additionally use Wi-Fi signal-strength, such as to augment a map such as a particle map or an occupancy or feature map including landmark features derived using adjacency sensor data and motion-sensor data, without using "at-a-distance" feature information from a stream of visual images from a camera or from another ranging-type sensor. The Wi-Fi signal strength map can also be applied as an independent factor to weight particles 540. For example, WiFi signal strength can be used to limit which adjacency-derived features can be considered as possible matches.

In an example, every free cell in every particle map 542 of every particle 540 can be encoded with the averaged WiFi signal strength observed as the robot 100 travelled over that area while in a mapping mode (e.g., transformed into the frame of the particular particle 540). A landmark feature can be validated using the WiFi signal strength, such as by checking the WiFi signal strength along the robot's trajectory while observing that landmark feature, and comparing those WiFi signal strength readings to those encoded in the free cells in a map that corresponds with that particular trajectory followed by the robot 100.

In an example, the WiFi signal strength can be encoded into the cells of a grid forming a WiFi occupancy map, such as to provide a WiFi occupancy sensor model that can be combined with adjacency sensor data that can be encoded into the cells of a grid in a corresponding adjacency-sensor based occupancy map. A combined WiFi and adjacency occupancy map can be created using joint probabilities of corresponding individual cells in the respective WiFi occupancy map and the adjacency-sensor based occupancy map. From various interactions that can occur with various aspects of the resulting combined WiFi and adjacency occupancy map as the robot moves about the environment, particles can have their respective hypotheses updated. Not all of these interactions need to be weighted equally in updating respective hypotheses of individual particles. An illustrative example of weighting various interactions in computing an updated particle hypothesis is given in Table 1, below.

TABLE 1

Example of Updating particle hypothesis by weighted interactions with combined WiFi and Adjacency occupancy map.

| Factor Example | Weight Example |
|---|---|
| Adjacency sensor (bump/wall proximity (IR)/cliff sensor) indicates robot is in contact with or adjacent to a location within a cell with an obstacle or cliff | 100% |
| Adjacency sensor indicates robot is 1 cell off in X or Y direction from cell with obstacle or cliff | 70% |
| Adjacency sensor indicates robot is 1 cell off in a diagonal cell direction from cell from cell with obstacle or cliff | 40% |
| Adjacency sensor indicates robot is 2 cells off in X or Y direction from cell with obstacle or cliff | 15% |
| Particle indicates robot has mapped adjacency-derived obstacle or cliff onto a free cell (indicated by WiFi) | 15% |
| Particle indicates that robot drove over mapped adjacency-derived obstacle or cliff | 10% |
| Particle indicates obstacle at unknown cell (e.g., a cell that is not mapped as an obstacle or as obstacle-free using WiFi) within the map boundary. | 50% (e.g., to help inhibit new mapping from scoring better than a previous overlapping mapping, but offset from the previous overlapping mapping, e.g., by 1 cell; can help promote successful loop closure). |

FIG. 7A shows a map of a room with various walls. FIG. 7B shows a corresponding occupancy grid map. FIG. 7C shows a corresponding WiFi signal strength map. In this example, the Wi-Fi signal strength shown in FIG. 7C is stronger toward the portion of the room in FIG. 7A that is located toward the top of the page.

Figure 8B:
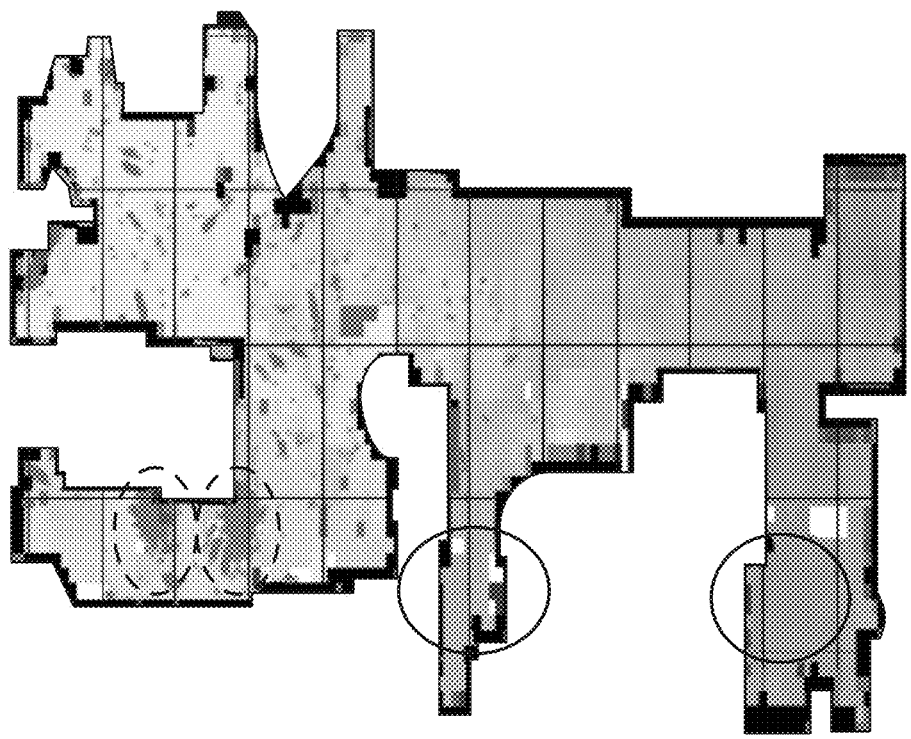

FIGS. 8A, 8B, and 8C show a corresponding temporal sequence of a localization mode in which the particle filter 530 can qualify—based on Wi-Fi signal strength—which identified landmark features and which corresponding particles are considered during operation of the particle filter 530. By setting an appropriate threshold on the Wi-Fi signal strength, in this example, only identified landmark features in the top portion of the maps are considered, and only corresponding particles in the top portion of the maps are created or seeded, because the Wi-Fi signal strength measured at the Wi-Fi receiver on the robot 100 exceeds a threshold value, which is consistent with the robot 100 being located in the top portions of the maps, based on Wi-Fi signal strength.

FIG. 8A shows an initial random or other seeding of particles limited to the top portion of the map, consistent with the robot's measured Wi-Fi signal strength exceeding a threshold value, corresponding to the top portion of the room, as evidenced by the previously-obtained Wi-Fi signal strength map.

FIG. 8B shows encircled landmark features toward the top of the room being considered during wall-following localization, while similar encircled features located toward the bottom of the room are disregarded, based in incompatible Wi-Fi signal strength.

FIG. 8C shows an encircled single particle cluster representing a robot localization meeting an appropriate confidence criterion such that the robot 100 can transition from localization mode to cleaning mode.

To recap, FIGS. 8A-8C exhibit an example of relatively quick convergence of the particle filter 530 to localize the robot with sufficient confidence to transition from localization mode to mission mode, with the short localization duration helped at least in part by using the Wi-Fi signal strength data in conjunction with the particle filter 530 and with identified landmark features determined using adjacency sensor and motion sensor data, without requiring distance information from an "at-a-distance" sensor, which, is a sensor from which actual distance from the robot to a physical object in the environment can be detected. A WiFi signal strength sensor does not constitute such an "at-a-distance" sensor because it does not provide such an actual distance from the robot to a wall or couch or other physical object in the environment. Instead, a WiFi signal strength sensor merely provides a more general indication of WiFi signal strength, which can be influenced by the physical structures and objects in the environment, but, when mapped is otherwise too ambiguous from which to obtain an actual distance from the robot to a landmark feature such as a physical object in the environment.

The particular robot localization technique, and whether further mapping is suppressed, can vary depending on the amount of uncertainty in the robot's location. For example, if the accumulated drift from the odometry or other motion sensor data indicates that one or more components of the error is large enough to warrant re-localization yet small enough to allow navigation to or wall-following of a nearby identified landmark, than re-localization can be performed accordingly, such as to confirm or improve upon the particle filter's location hypothesis.

Even if the robot has been kidnapped, if the kidnap is short enough in duration, then any mapping can be suspended, and the robot can be placed into a localization mode in which an assumption can be made about how far the robot was carried during the short kidnap. The particle filter can be seeded with particles so as to form a Gaussian distribution around a hypothesis consistent with the possible re-positionings of the robot arising from the short kidnap. With such a seeding, the robot can be directed to coastal navigate to the nearest landmark to confirm or improve the robot location hypothesis. Because of the uncertainty of the particular location at which the robot encounters the particular landmark feature, such as can result from the short kidnap, the robot may be commanded to maneuver to try to repeat the wall-following expected of that particular landmark feature (or to coastal navigate to and wall-follow to seek a sequence of multiple adjacency-derived landmark features, optionally, in combination with WiFi signal strength information) before confirming re-localization.

For a longer duration kidnap or other more global localization event, then any mapping can be suspended and, using an existing map, a distributed particle seeding may be used to re-initialize the particle filter. While such a distributed particle seeing can be uniform, it need not be. For example, WiFi signal strength information can be used to seed the particles limited to one or more portions of the map consistent with such a WiFi signal strength. In another example, a dock location may be emphasized or otherwise used in seeding the particle filter after such a longer duration kidnap or other completely new localization event. Because of the uncertainty created by the longer duration kidnap, the full particle filter localization involving coastal navigation and encouraging wall-following can be performed to help localize the robot.

After localization is performed, the robot can be transitioned out of the localization mode and into a cleaning, mapping, or other mission mode. If no localization is possible, then the robot can be transitioned into a new map generation mode, in which coastal navigation techniques can be used to collect adjacency-sensor data, WiFi data, or both, to build a completely new map.

During localization mode, while mapping is suspended, the robot can still maintain an observed obstacle grid, such as which it can merge with an existing map, such as for temporary path planning purposes. In the localization mode, the particle filter may include more particles than in a cleaning, mapping, or other mission mode, since this permits more hypotheses during localization. Moreover, during localization, the filter may be seeded with even more particles during an initial stage or phase of the localization, such as to permit more hypothesis during this initial phase of the localization, before reducing the number of particles in play as more information develops, such as upon encountering one or more adjacency-derived features, or based on information from the WiFi signal strength map.

While this document has emphasized the use of adjacency sensor and motion sensor data to avoid the expense and complexity of using a camera, LIDAR, or other "at-a-distance" sensor data, and has explained how to overcome the additional technical challenges presented when relying on adjacency sensor and motion sensor data without using such "at-a-distance" sensor data, it is understood that the present techniques could also be applied in a use-case that does include a camera or other "at-a-distance" sensor, such as to augment the particle filter and other robot localization and mapping techniques of such an approach that can include such an "at-a-distance" sensor.

While this document makes reference to the mobile cleaning robot 100 that performs floor cleaning, the robot scheduling and controlling system and methods discussed herein can be used in robots designed for different applications, such as mopping, mowing, transporting, surveillance, among others. Additionally, while some components, modules, and operations may be described as being implemented in and performed by the mobile cleaning robot 100, by a user, by a computing device, or by another actor, these operations may, in some implementations, be performed by actors other than those described. For example, an operation performed by the mobile cleaning robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the mobile cleaning robot 100. In some implementations, the mobile cleaning robot 100 can perform, in addition to the operations described as being performed by the mobile cleaning robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations may be omitted, or additional operations or sub-operations may be added.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A mobile cleaning robot, comprising:
   a drive system, configured to move the robot about a base surface of an environment;
   a non-imaging and non-distance-ranging motion sensor, configured to receive at least one of odometry or inertial motion sensor data to monitor movement of the robot about the environment without using imaging or distance-ranging data;
   a non-imaging and non-distance-ranging adjacency sensor configured to receive non-imaging and non-distance-ranging adjacency sensor data indicating an obstacle in the environment being adjacent to or in contact with the robot at a level of the robot or of the base surface; and
   a controller circuit configured to:
      direct the mobile cleaning robot to follow along an obstacle detected using the adjacency sensor;
      execute a particle filter including a plurality of particles, respective particles including a non-imaging-based particle map of at least a portion of the environment, a robot location and pose hypothesis within its particle map, and a weight representing a probability of the particle map representing an environment map;
      seed the particle filter based at least in part on a duration of repositioning the robot from a first location to a second location in the environment that occurs without the drive system performing the repositioning; and
      update one or more particle maps respectively associated with one or more of the particles based on the received motion sensor data and the received adjacency sensor data without using imaging data or distance-ranging data.

2. The mobile cleaning robot of claim 1, wherein the controller is configured to, in a first localization mode:
   assign or weight particles based on at least one corresponding particle map and based on comparing the received motion sensor data and adjacency sensor data with corresponding information associated with one or more identified landmark features defined without using imaging data or distance-ranging data;

select at least one particle based on the assigned weights; and localize the robot based on a robot location and pose hypothesis associated with the at least one selected particle.

3. The mobile cleaning robot of claim 1, comprising:

at least one wireless receiver, onboard the robot, configured to receive a wireless communication signal transmitted by at least one electronic wireless transmitter device local to the environment, and coupled to the controller to provide an indication of wireless signal strength of the received wireless communication signal; and wherein the controller is configured to modify the respective weights of the particles using the indication of wireless signal strength at one or more locations of the robot in the environment.

4. The mobile cleaning robot of claim 3, wherein the particle map includes a feature map storing identified landmark features that are at a level of the robot or of the base surface and are constructed using odometry or inertial motion sensor data and adjacency sensor data without using imaging data or distance-ranging data, and wherein the controller is configured to use the indication of wireless signal strength to determine a subset of identified landmark features in the feature map for use in localizing the robot.

5. The mobile cleaning robot of claim 3, wherein the particle map includes a feature map storing identified landmark features that are at a level of the robot or of the base surface and are constructed using odometry or inertial motion sensor data and adjacency sensor data without using imaging data or distance-ranging data, and wherein the controller is configured to use the indication of wireless signal strength to seed the particle filter for use in localizing the robot.

6. The mobile cleaning robot of claim 3, wherein the controller is configured:

to initiate a first localization mode in response to detecting the repositioning of the robot from the first location to the second location in the environment that occurs without the drive system performing the repositioning and after the drive system has been used to move the robot during a mission; and to use the indication of wireless signal strength and the duration elapsed during the repositioning to seed the particle filter for use during the first localization mode.

7. The mobile cleaning robot of claim 2, wherein the controller is further configured to transition from the first localization mode to a cleaning mission mode in which the controller directs the drive system to navigate the mobile cleaning robot to perform a cleaning mission in response to the localization mode completing localizing the robot based on the robot location and pose hypothesis associated with the at least one selected particle.

8. The mobile cleaning robot of claim 1, wherein the controller is configured to:

estimate a localization drift of the robot using at least one of the motion sensor data or the adjacency sensor data; and determine when at least a component of the estimated drift exceeds at least one threshold criterion and, in response, initiate a first localization mode.

9. The mobile cleaning robot of claim 1, wherein the controller is configured to:

estimate a localization drift of the robot using at least one of the motion sensor data or the adjacency sensor data;

when an estimated drift of the robot does not exceed at least one threshold criterion, coastal navigate toward at least one goal using a path including or promoting wall-following on the way to the goal; and when an estimated drift of the robot does exceed the at least one threshold criterion, transitioning into a first localization mode and inhibiting mapping of adjacency-based landmark features until the estimated drift falls below the at least one threshold criterion.

10. The mobile cleaning robot of claim 1, wherein the controller is configured:

to initiate a first localization mode in response to detecting the repositioning of the robot from the first location to the second location in the environment that occurs without the drive system performing the repositioning and after the drive system has been used to move the robot during a mission; and to seed the particle filter, based on the duration of the repositioning, for use during the first localization mode.

11. The mobile cleaning robot of claim 1, wherein the controller circuit is configured to include a mapping mode for creating or updating identified landmark features of a feature map for use with the particle filter, including:

to detect a landmark feature candidate at a level of the robot or of the base surface in the environment using the motion sensor data and the adjacency sensor data, without using imaging data or distance-ranging data, to provide characteristic of the robot following along the landmark feature candidate;

to recognize the detected landmark feature candidate as an identified landmark feature stored in a feature map of at least a portion of the environment for use with the particle filter, when a comparing of the landmark candidate feature to an identified landmark feature indicates a match; and to declare and store the detected landmark candidate feature as an identified landmark in an absence of a match when a characteristic of the landmark candidate feature meets at least one criterion.

12. The mobile cleaning robot of claim 11, wherein the controller circuit is configured to declare a landmark candidate feature as an identified landmark feature, without using imaging data or distance-ranging data, based at least in part on at least one of:

a length of a trajectory;

a length of the trajectory during a bump-following or wall-following of the landmark candidate feature;

a distance of the trajectory from one or more previously identified landmark features;

an orientation of the trajectory;

an orientation of the trajectory with respect to one or more previously identified landmark features;

a path shape of the trajectory; or point-cloud data associated with a bump-following or a wall-following of the landmark candidate feature.

13. The mobile cleaning robot of claim 11, wherein the identified landmark feature includes a straight segment.

14. The mobile cleaning robot of claim 11, wherein the identified landmark feature includes at least two adjacent straight path segments meeting at an angle that exceeds a minimum threshold value.

15. The mobile cleaning robot of claim 11, wherein the identified landmark feature includes at least two adjacent straight path segments meeting perpendicularly to define a right angle corner.

16. The mobile cleaning robot of claim 11, wherein the identified landmark feature includes three joined adjacent straight path segments meeting perpendicularly to define a right angle U-turn.

17. The mobile cleaning robot of claim 11, wherein the mapping mode includes a phase in which the controller directs the drive system to locate and wall-follow for closing a loop defined at least in part by an outer periphery defined by walls enclosing a portion of the environment in which the robot is located.

18. The mobile cleaning robot of claim 1, wherein executing the particle filter includes:
generating a Gaussian distribution using as its central tendency parameter at least one of the motion sensor data or robot location coordinate data generated using the motion sensor data; and
sampling the Gaussian distribution for generating the particles associated with the particle filter.

19. The mobile cleaning robot of claim 1, wherein the controller is configured to, in a first localization mode:
direct the drive system to move the robot to an obstacle detected using the adjacency sensor, and to follow along the obstacle as a landmark candidate; and
when the following of the obstacle as the landmark candidate sufficiently matches at least one identified landmark, at least one of seeding or updating the particle filter with one or more hypotheses about the robot location and pose and, when enough identified landmarks have been encountered such that at least one first criterion is met by a specified proportion of updated particle hypotheses, transitioning out of the first localization mode, otherwise to continue in the first localization mode by navigating to and following one or more other landmark candidates until enough identified landmarks have been encountered such that at least one first criterion is met by a specified proportion of updated particle hypotheses.

20. The mobile cleaning robot of claim 1, wherein the controller is configured to, in a first localization mode:
seed particles on a selected particle map, the seeding based on at least one of WiFi signal strength data or based on one or more landmark features defined without using imaging data or distance-ranging data;
updating hypotheses of corresponding ones of the particles, the hypotheses updated based on the received motion sensor data and adjacency sensor data and WiFi signal strength data;
when at least one first criterion is met by a specified proportion of updated particle hypotheses, localizing the robot based on a robot location and pose hypothesis associated with at least one selected particle of the updated one or more particles.

21. The mobile cleaning robot of claim 20, wherein at least one of the received motion sensor data or adjacency sensor data includes at least one of wall-following trajectory path data or point-cloud data.

22. The mobile cleaning robot of claim 20, comprising triggering the first localization mode when uncertainty is above a first threshold.

23. The mobile cleaning robot of claim 1, wherein the controller is configured to, in a second localization mode:
plan a path to direct the drive system to move the robot toward one or more landmark candidates selected using one or more corresponding identified landmarks, and to follow along the landmark candidate;
at least one of seeding or updating one or more particles and corresponding particle hypotheses based on the following along the one or more landmark candidates; and
when at least one first criterion is met by a specified proportion of updated particle hypotheses, localizing the robot based on a robot location and pose hypothesis associated with at least one selected particle of the updated one or more particles.

24. The mobile cleaning robot of claim 23, wherein the controller is configured to, in the second localization mode:
prefer coastal navigation employing opportunistic wall following associated with the planned path to direct the drive system to move the robot toward the one or more landmark candidates;
updating one or more particles and corresponding particle hypotheses based on the wall following on the way to the one or more landmark candidates; and
when at least one second criterion is met by a specified proportion of updated particle hypotheses, localizing the robot based on a robot location and pose hypothesis associated with at least one selected particle of the updated one or more particles.

25. The mobile cleaning robot of claim 23, comprising triggering the second localization mode when uncertainty is above a second threshold but below a first threshold.

26. A method of operating a mobile cleaning robot, the method comprising:
moving the robot about a base surface of an environment, using a drive system of the robot;
receiving at least one of odometry or inertial motion sensor data to monitor movement of the robot about the environment without using imaging or distance-ranging data;
receiving non-imaging and non-distance-ranging adjacency sensor data indicating an obstacle in the environment being adjacent to or in contact with the robot at a level of the robot or of the base surface;
directing the mobile cleaning robot to follow along an obstacle detected using the adjacency sensor;
executing a particle filter including a plurality of particles, respective particles including a non-imaging-based particle map of at least a portion of the environment, a robot location and pose hypothesis within its particle map, and a weight representing a probability of the particle map representing an environment map;
seeding the particle filter based at least in part on a duration of repositioning the robot from a first location to a second location in the environment that occurs without the drive system performing the repositioning; and
updating one or more particle maps respectively associated with one or more of the particles based on the received motion sensor data and the received adjacency sensor data without using imaging data or distance-ranging data.

27. The method of claim 26, comprising, in a first localization mode:
assigning or weighting particles based on at least one corresponding particle map and based on comparing the received motion sensor data and adjacency sensor data with corresponding information associated with one or more identified landmark features defined without using imaging data or distance-ranging data;
selecting at least one particle based on the assigned weights; and localizing the robot based on a robot location and pose hypothesis associated with the at least one selected particle.

28. The method of claim 26, comprising:

receiving, via at least one wireless receiver onboard the robot, a wireless communication signal transmitted by at least one electronic wireless transmitter device local to the environment, and generating an indication of wireless signal strength of the received wireless communication signal; and modifying the respective weights of the particles using the indication of wireless signal strength at one or more locations of the robot in the environment.

29. The method of claim 28, wherein the particle map includes a feature map storing identified landmark features that are at a level of the robot or of the base surface and are constructed using odometry or inertial motion sensor data and adjacency sensor data without using imaging data or distance-ranging data, the method further comprising using the indication of wireless signal strength to determine a subset of identified landmark features in the feature map for use in localizing the robot.

30. The method of claim 28, wherein the particle map includes a feature map storing identified landmark features that are at a level of the robot or of the base surface and are constructed using odometry or inertial motion sensor data and adjacency sensor data without using imaging data or distance-ranging data, the method further comprising using the indication of wireless signal strength to seed the particle filter for use in localizing the robot.

* * * * *